US 7,379,930 B2

(12) United States Patent
Kasatani

(10) Patent No.: US 7,379,930 B2
(45) Date of Patent: May 27, 2008

(54) CONFIDENTIAL COMMUNICATIONS EXECUTING MULTIFUNCTIONAL PRODUCT

(75) Inventor: Kiyoshi Kasatani, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 387 days.

(21) Appl. No.: 11/065,566

(22) Filed: Feb. 25, 2005

(65) Prior Publication Data
US 2005/0210031 A1   Sep. 22, 2005

(30) Foreign Application Priority Data
Feb. 25, 2004   (JP)   ............... 2004-049166

(51) Int. Cl.
*G06F 7/00* (2006.01)
(52) U.S. Cl. ............................ 707/3; 707/10
(58) Field of Classification Search ............ 707/1–10
See application file for complete search history.

(56) References Cited
U.S. PATENT DOCUMENTS

2003/0033288 A1 *  2/2003  Shanahan et al. ............ 707/3
2005/0071483 A1 *  3/2005  Motoyama ............... 709/230
2005/0099650 A1 *  5/2005  Brown et al. ............ 358/1.15

FOREIGN PATENT DOCUMENTS

| JP | 9-284448 | 10/1997 |
|---|---|---|
| JP | 2000-216944 | 8/2000 |
| JP | 2001-351061 | 12/2001 |

\* cited by examiner

Primary Examiner—Wilson Lee
(74) Attorney, Agent, or Firm—Oblon, Spivak, McClelland, Maier & Neustadt, P.C.

(57) ABSTRACT

A multifunctional product connected with a plurality of terminals over a network includes an image information obtaining device that obtains image information, a document file storing device that stores the image information in a prescribed location as a document file, and a designating device that designates a prescribed terminal to receive the document file. A file transmission device is provided to transmit the document file to the prescribed terminal simultaneously when the document file storing device stores the image information in the document file.

8 Claims, 40 Drawing Sheets

(PERSONAL SETTING INFORMATION)

(PERSONAL INFORMATION)

FIG. 8A

| MAIL DESTINATION (100 CASES) |
| --- |
| FAX DESTINATION (100 CASES) |
| GROUP DESTINATION (100 CASES) |
| FILE DESTINATION (100 CASES) |
| CASE NAME/BODY TEXT (100 CASES) |
| DOCUMENT NAME/ USER NAME (100 CASES) |

(REGISTRATION INFORMATION)

FIG. 8B

| NAME |
| --- |
| MAIL ADDRESS |
| BELONGING SECTION |
| TRANSMISSION OPTION DESIGNATION |
| INTERNET FAX TRANSMISSION |
| SMTP SERVER DESIGNATING TRANSMISSION |
| SMTP SERVER ADDRESS |
| MAIL TRANSMISSION AUTHORIZATION |
| AUTHORIZATION TYPE |
| AUTHORIZATION POP SERVER ADDRESS (ONLY AT TIME OF POP AUTHORIZATION) |
| AUTHORIZATION USER NAME |
| AUTHORIZATION PASSWORD |
| OCR DESTINATION DESIGNATION |

(MAIL DESTINATION:ONE CASE VALUE)

(FAX DESTINATION : ONE CASE VALUE)

(GROUP DESTINATION : ONE CASE VALUE)

(FILE DESTINATION : ONE CASE VALUE)

FIG. 9A

| SERVER TYPE | NETWORK PATH |
|---|---|
| Windows FILE SERVER | "¥¥\<host>¥\<path>" OR "file://[\<user>:\<password>@]\<host>/\<path>" |
| FTP SERVER | "ftp://[\<user>:\<password>@]\<host>[:\<port>]/\<path>" |
| Web DAV SERVER | "http(s)://[\<user>:\<password>@]\<host>[:\<port>]/\<path>" |
| EXTERNAL DOCUMENT ADMINISTRATIVE SERVER | UP TO SPECIFICATION OF EXTERNAL SERVER PLUG IN |

(NETWORK PATH OF FILE DESTINATION)

FIG. 9B

| LOCAL MEDIA TYPE | ABBREVIATED EXPRESSIONS | LOCAL PATH |
|---|---|---|
| COMPACT FRASH | cf | "file:///cf:\<path>" |
| SMART MEDIA | Sm | "file:///sm:\<path>" |
| SD MEMORY CARD | Sd | "file:///sd:\<path>" |
| MEMORY STICK | Ms | "file:///ms:\<path>" |
| DVD/CD-ROM (OPTION) | Cd | "file:///cd:\<path>" |

(LOCAL PATH OF FILE DESTINATION)

FIG. 9C

| CASE NAME |
|---|
| BODY CONTEXT |

(CASE NAME/BODY CONTEXT: ONE CASE VALUE)

FIG. 9D

| DOCUMENT NAME |
|---|
| OCR |
| USER NAME |

(DOCUMENT NAME/USER NAME : ONE CASE VALUE)

FIG. 10A

| |
|---|
| READING CONDITIONS (12 PIECES) |
| IMAGE PROCESSING CONDITION (12 PIECES) |
| TRANSMISSION/STORAGE CONDITION ONE TOUCH (20 PIECES) |
| PRINT CONDITION ONE TOUCH (20 PIECES) |
| RECEPTION MAIL BOX (12 PIECES) |
| SHARING MEDIA ADDRESS (12 PIECES) |
| FILE TRANSMISSION LINK ADDRESS (12 PIECES) |

(PRESET INFORMATION)

FIG. 10B

| |
|---|
| NAME |
| ICON |
| DISPLAY/ABSENCE |
| ORIGINAL DOCUMENT TYPE |
| IMAGE QUALITY |
| RESOLUTION |
| READING DENSITY |
| READING SIZE |
| STANDARD SIZE |
| AMORPHOUS FORM |
| FRAME ERASING |
| DUPLEX READING |

(READING CONDITIONS)

FIG. 11A

| NAME |
|---|
| ICON |
| DISPLAY/ABSENCE |
| IMAGE QUALITY CORRECTION |
| PAGE NUMBER DESIGNATION |
| AUTO IMAGE QUALITY CORRECTION |
| LIGHTNESS |
| CONTRAST |
| BRIGHTNESS |
| HUE |
| ROTATION |
| PAGE NUMBER DESIGNATION |
| ROTATIONAL DIRECTION |
| COLOR SUBTRACTION/ INTO MONOCHROME |
| PAGE NUMBER DESIGNATION |
| NUMBER OF COLORS |
| DROPOUT COLOR |
| SUBTRACT ONLY CHARACTOR COLOR |
| RESOLUTION WITHOUT CHARACTER |

(IMAGE PROCESSING CONDITION : CONTINUED)

FIG. 11B

| CLIPPING |
|---|
| PAGE NUMER DESIGNATION |
| CLIP REGION |
| ORIGINAL IMAGE |
| RESOLUTION OF ORIGINAL IMAGE |
| WHITE SHEET REMOVAL |
| PAGE NUMBER DESIGNATION |

(IMAGE PROCESSING CONDITIONS : SEQUEL)

FIG. 12A

| NAME |
| --- |
| CHARACTER SIZE |
| ICON |
| DISPLAY/ABSENCE |
| ADDRESS |
| CASE NAME |
| BODY CONTEXT |
| STORAGE |
| DOCUMENT NAME |
| USER NAME |
| PASSWORD |
| FRACTURING STORAGE |
| THUMBNAIL DESIGNATION |
| DESTINATION |
| DOCUMENT NAME |
| TRANSMISSION OPTION DESIGNATION |
| FILILNG TYPE |
| LINK TRANSMISSION |
| LINK TYPE |
| THUMBNAIL TRANSMISSION |
| FILE INTEGRATION |

- ADDRESS, CASE NAME, BODY CONTEXT: REGARDING MAIL TRANSMISSION
- STORAGE, DOCUMENT NAME, USER NAME, PASSWORD: REGARDING DOCUMENT STORAGE
- FRACTURING STORAGE, THUMBNAIL DESIGNATION: STORAGE OPTION
- DESTINATION, DOCUMENT NAME: REGARDING DOCUMENT TRANSMISSION (TRANSMISSION/STORAGE CONDITION ONE TOUCH : CONTINUED)

FIG. 12B

| READING CONDITION |
| --- |
| IMAGE PROCESSING CONDITION |
| TRANSMISSION/STORAGE FORM DESIGNATION |
| FILE NAME |
| FILE DATE |
| PERSONAL NAME |

(TRANSMISSION/STORAGE CONDITION ONE TOUCH : SEQUEL)

FIG. 13

| NAME |
|---|
| CHARACTER SIZE |
| ICON |
| DISPLAY/ABSENCE |
| PRINTING TYPE |
| COLOR TYPE |
| IMAGE QUALITY PRIORITY/SPEED PRIORITY |
| DUPLEX PRINTING |
| SORT/STACK |
| PUNCH |
| STAPLE |
| SHEET SELECTION |
| SHEET TYPE |
| IMAGE PROCESSING CONDITION |
| PRINT FORM DESIGNATION |
| FILE NAME |
| FILE DATE |
| PERSONAL NAME |

(PRINTING CONDITION ONE TOUCH)

| NAME |
| ICON |
| ACCOUNT NAME |
| TRANSMISSION/ STORAGE |
| FAX TRANSMISSION |
| PRINTING |
| COVERING LETTER FORM DESIGNATION |
| RESULT RETURNING MAIL |
| SETTING TO RECEPTION FAX TRANSFER DESTINATION |

(RECEPTION MAIL BOX)

[01] : ERROR MAIL
[02] : FAX MAIL
[03] : PRINT MAIL
[04] : STORAGE MAIL
[05-12] : (EMPTY)

(INITIAL VALUE OF NAME)

[01] : SENDER
[02] : FAX
[03] : PRINT
[04] : STORE
[05-12] : (EMPTY)

(INITIAL VALUE OF ACCOUNT NAME)

(SHARING MEDIA ADDRESS)

(FILE TRANSMISSION LINK ADDRESS)

FIG. 15A

| FUNDAMENTAL SETTING |
|---|
| DISPLAY SETTING |
| READING SETTING |
| COMMUNICATIONS SETTING |
| STORAGE SETTING |
| PRINT SETTING |
| OCR SETTING |

(PERSONAL SYSTEM SETTING INFORMATION)

FIG. 15B

| AUTO TERMINATION OF PERSONAL MENU (ONLY INDIVIDUAL) |
|---|
| SETTING AUTO CLEAR TIME (ONLY GUEST) |
| COMING BACK TO MAIN SCREEN AFTER END OF OPERATION |
| SETTING KEY INPUT/ SCREEN TOUCH SOUND |
| AUTO INPUTTING OF CASE NAME OF MAIL |
| AUTO INPUTTING OF MAIL BODY CONTEXT |
| TEXT FILE TYPE |
| SETTING COMPRESSION AT TIME OF CONVERSION INTO TIFF IMAGE |
| SETTING IMAGE QUALITY AT TIME OF CONVERSION INTO JPEG IMAGE |
| MAXIMUM NUMBER OF COLORS AT TIME OF CONVERSION INTO PNG IMAGE |

(FUNDAMENTAL SETTING)

(DISPLAY SETTING)

(READING SETTING)

(COMMUNICATION SETTING)

(STORAGE SETTING)

(PRINT SETTING)

(OCR SETTING)

(SECURITY)

(NETWORK ACCESS RESTRICTION)

(MAIL TRANSMISSION AUTHORIZATION)

(ACCESS AUTHORITY SETTING)

FIG. 20A

| NETWORK SETTING |
| --- |
| MAIL SETTING |
| FAX SETTING |
| FILE COMMUNICATIONS SETTING |
| SYSTEM ADMINISTRATION |

(SYSTEM SETTING INFORMATION)

FIG. 20B

| HOST NAME |
| --- |
| DOMAIN NAME |
| IP ADDRESS |
| SUBNET MASK |
| GATEWAY ADDRESS |
| 1ST DNS SERVER ADDRESS |
| 2ND DNS SERVER ADDRESS |
| PROXY SERVER SETTING |
| PROXY SEVER ADDRESS |
| PROXY SERVER PORT NO. |
| VIRGIN PROXY ADDRESS |
| USER NAME |
| PASSWORD |
| SSL ENCRYPTION |
| ISO COUNTRY CODE |
| PREFECTURE NAME |
| CITY NAME |

(NETWORK SETTING : CONTINUE)

FIG. 20C

| COMPANY NAME/ ORGANIZATION NAME |
| :---: |
| DEPARTMENT NAME/ ORGANIZATION NAME/BE- LONGING SECTION NAME |
| SERVER NAME |
| ADMINISTRATOR MAIL ADDRESS |
| VALID TERM |
| PORT NUMBER SETTING |
| SMTP TRANSMISSION |
| SMTP RECEPTION |
| POP |
| FTP |
| HTTP |
| HTTPS |
| LDAP |
| PRINTER IP ADDRESS |
| LAN SPEED |
| PHYSICAL ADDRESS (MAC) |

(NETWORK SETTING : SEQUEL)

FIG. 21A

| SMTP SERVER IP ADDRESS |
| --- |
| MAIL RECEPTION PROTOCOL |
| POP MAIL ADDRESS |
| POP SERVER ADDRESS |
| POP ACCOUNT NAME |
| POP PASSWORD |
| POP MAIL RECEPTION INTERVAL |
| POP MAIL RULE TRANSFER DESTINATION |
| USING DISCLOSED ADDRESS BOOK |
| FIRST LDAP SERVER ADDRESS |
| IDENTIFICATION NAME |
| SECOND LDAP SERVER ADDRESS |
| IDENTIFICATION NAME |
| AUTOMATIC UPDATING OF DISCLOSED ADDRESS BOOK |
| MAIL TRANSMISSION AUTHORIZATION |
| AUTHORIZATION SYSTEM |
| AUTHORIZATION POP SERVER ADDRESS |
| AUTHORIZATION USER NAME |
| AUTHORIZATION PASSWORD |

(MAIL SETTING : CONTIUNUE)

FIG. 21B

| TRANSMISSION SIZE RESTRICTION |
| --- |
| MAXIMUM SIZE |
| MAIL DIVISION |
| TRANSMISSION INTERVAL |
| RETRANSMISSION INTERVAL |
| NUMBER OF RETRANSMISSIONS |

(MAIL SETTING:SEQUEL)

(FAX SETTING)

(FILE COMMUNICATIONS SETTING)

(SYSTEM ADMINISTRATION)

(STORAGE DOCUMENT)

(CAREER ADMINISTRATION)

(SECURITY)

(TIME & DAY SETTING)

(CONFIDENTIAL LINK INFORMATION TABLE)

(CONFIDENTIAL LINK INFORMATION)

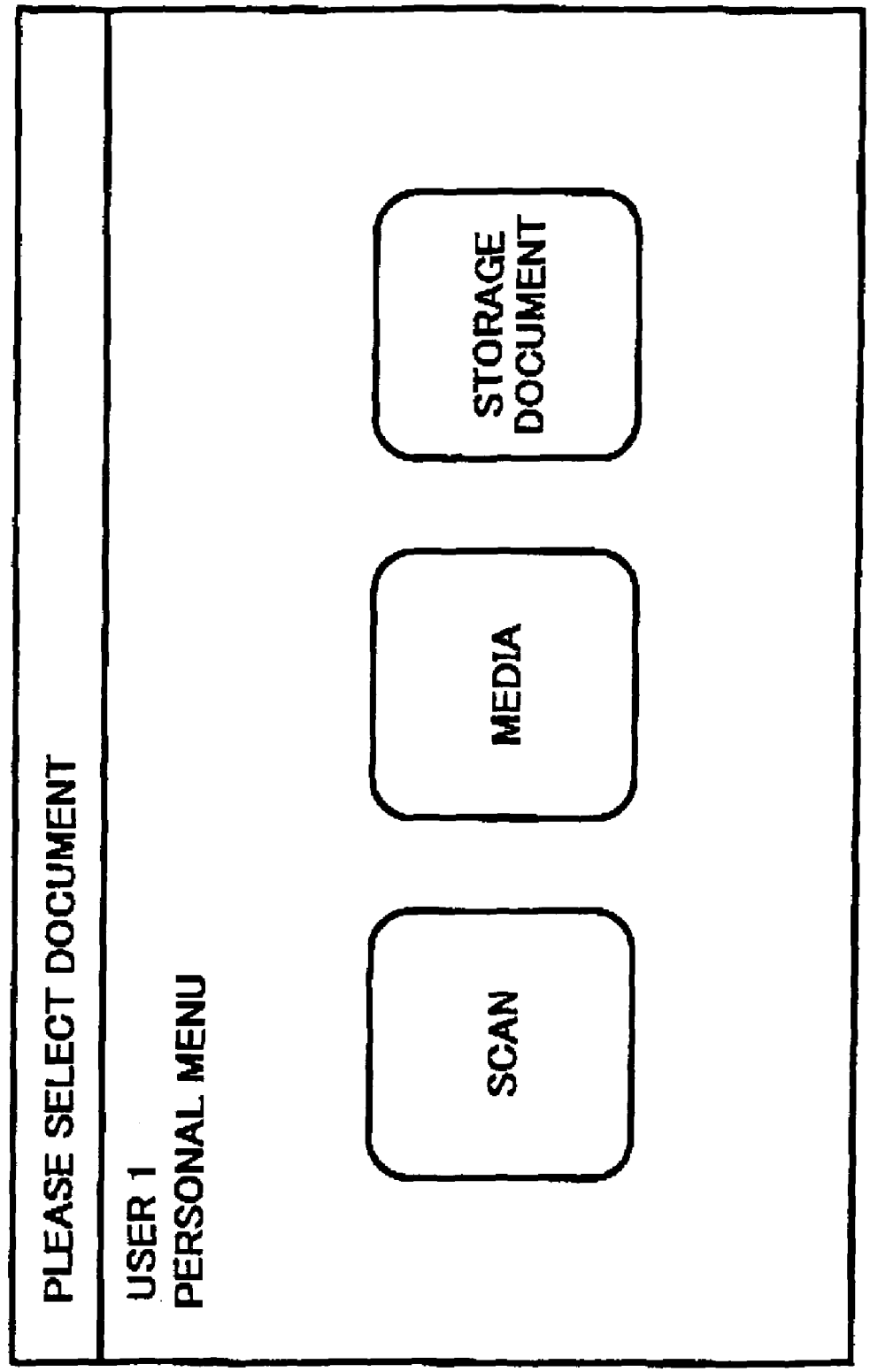

FIG. 26B

READY TO TRANSMIT
PLEASE DESIGNATE DESTINATION & DEPRESS START KEY

DESTINATION DESIGNATION
PLEASE ADD NEXT DESTINATION IF ANY, DEPRESS "OK" IF NOT.

>>DESTINATION ADDITION    TO : PLANNING DEPARTMENT<creator@cr.****.jp>    CANCEL    OK TO :    Cc:    Bcc:    NUMBER OF DESTINATIONS : 1/1    CLEAR

FAX DESTINATION    GROUP DESTINATION    DIRECT INPUT

| MAIL DESTINATION | | | |
|---|---|---|---|
| NAME | MAIL ADDRESS | | BELONGING SECTION |
| SERVICE DEPARTMENT | service@sa.****.jp | | MARKETING DEPARTMENT |
| PLANNING DEPARTMENT | creator@cr.****.jp | | PLANNING DEPARTMENT |
| USER 1 | user1@kb.****.jp | | SUPPORT DEPARTMENT |
| USER 2 | user2@cr.****.jp | | PLANNING DEPARTMENT |

ALL CASES DISPLAY

RETRIEVAL

1/2    ▲ TO LAST PAGE    ▼ TO NEXT PAGE

FIG. 27A

READY TO TRANSMIT
PLEASE DESIGNATE DESIGNATIOIN & DEPRESS START KEY

DESIGNATE MAIL RETURNING DESTINATION
PLEASE DESIGNATE MAIL RETURNING DESTINATION

SERVICE DEPARTMENT〈service@sa.****.jp〉　　CANCEL　OK

CLEAR

FAX DESTINATION　GROUP DESTINATION　DIRECT INPUT

ALL CASES DISPLAY

RETRIEVAL

1/2　◀ TO LAST PAGE　▶ TO NEXT PAGE

| PERSONAL MAIL RETURNING DESTINATION | | BELONGING SECTION |
|---|---|---|
| NAME | MAIL ADDRESS | |
| SERVICE DEPARTMENT | service@sa.****.jp | MARKETING DEPARTMENT |
| PLANNING DEPARTMENT | creator@cr.****.jp | PLANNING DEPARTMENT |
| USER 1 | user1@kb.****.jp | SUPPORT DEPARTMENT |
| USER 2 | user2@cr.****.jp | PLANNING DEPARTMENT |

FIG. 27B

READY TO TRANSMIT
PLEASE DESIGNATE DESTINATION & DEPRESS START KEY

CASE NAME DESIGNATION
PLEASE DESIGNATE CASE NAME

[PLEASE CONSIDER]   [CANCEL]  [OK]
[DIRECT INPUT]                 [CLEAR]

| REGISTERED CASE NAME | | 006 | CATALOG DATA |
|---|---|---|---|
| 001 | I AM SENDING MINUTES | 007 | *UNREGISTERED |
| 002 | PLEASE CONSIDER | 008 | *UNREGISTERED |
| 003 | CIRCULATION | 009 | *UNREGISTERED |
| 004 | URGENT ! | 010 | *UNREGISTERED |
| 005 | HERE IS DATA | | |

1/9  ▲ TO LAST PAGE   ▼ TO NEXT PAGE

FIG. 29A

TRANSMISSION OPTION

PLEASE SELECT TRANSMISSION TYPE
※COMMON SETTING FOR MAIL & FAX TRANSMISSIONS

| | | | | CANCEL | OK |
|---|---|---|---|---|---|

■ FILE TYPE

| NO CHANGE | IMAGE FILE | IMAGE PDF | IMAGE PDF + DCR |
|---|---|---|---|

■ LINK TRANSMISSION

| EXECUTION | ABSENT |
|---|---|

■ LINK TYPE

| DOCUMENT STORAGE LINK | FILE TRANSMISSION LINK |
|---|---|

■ FILE TRANSMISSION LINK ADDRESS

| ※NO DESIGNATION | | CHANGE |
|---|---|---|

■ THUMBNAIL TRANSMISSION

| DO | DO NOT |
|---|---|

■ FILE INTEGRATION

| DO | DO NOT |
|---|---|

FIG. 29B

TRANSMISSION OPTION

PLEASE SELECT TRANSMISSION TYPE
※COMMON SETTING FOR MAIL & FAX TRANSMISSIONS

■ FILE TYPE

| NO CHANGE | IMAGE FILE | IMAGE PDF | IMAGE PDF + DCR |

■ LINK TRANSMISSION

| EXECUTION | ABSENT |

■ LINK TYPE

| DOCUMENT STORAGE LINK | FILE TRANSMISSION LINK |

■ FILE TRANSMISSION LINK ADDRESS

| NO DESIGNATION | CHANGE |

■ THUMBNAIL TRANSMISSION

| DO | DO NOT |

■ FILE INTEGRATION

| DO | DO NOT |

CANCEL    OK

FIG. 30

TRANSMISSION OPTION

PLEASE SELECT TRANSMISSION TYPE
※COMMON SETTING FOR MAIL & FAX TRANSMISSIONS

[ CANCEL ]   [ OK ]

■ FILE TYPE

| NO CHANGE | IMAGE FILE | IMAGE PDF | IMAGE PDF + OCR |

■ LINK TRANSMISSION

| DO | DO NOT |

■ LINK TYPE

| DOCUMENT STORAGE LINK | FILE TRANSMISSION LINK |

■ FILE TRANSMISSION LINK ADDRESS

| ※NO DESIGNATION | CHANGE |

■ THUMBNAIL TRANSMISSION

| DO | DO NOT |

■ FILE INTEGRATION

| DO | DO NOT |

CONFIDENTIAL COMMUNICATIONS EXECUTING MULTIFUNCTIONAL PRODUCT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application claims priority under 35 USC § 119 to Japanese Patent Application No. 2004-049166 filed on Feb. 25, 2004, the entire contents of which are hereby incorporated herein by reference.

BACKGROUND OF THE INVENTION

1. Field of the Invention

The present invention relates to a networked multifunctional product that communicates various data with other terminal apparatuses over a network by applying various communications protocols.

2. Discussion of the Background Art

A network communications system sometimes includes a network multifunctional product that communicates various data with other terminal apparatuses over a network by applying various communications protocols.

In such a network communications apparatus, various application services are provided while the network multifunctional product acts as a core. For example, an image read from an original document is transmitted to a designated mail destination by electronic mail as a "scan to email service". A body context of a reception email and an image of an attached file or the like are printed out as an "electronic mail printout service". Similarly, a body context of a reception email and an image of an attached file or the like are transmitted to a designated facsimile as an "electronic mail facsimile transfer service".

In such a network communications system, it is preferable that a file is transmitted from the network multifunctional product to a designated user by various communications devices in various manners.

SUMMARY OF THE INVENTION

An object of the present invention is to provide a novel multifunctional product that communicates data with a plurality of terminals over a network using a prescribed communications protocol.

Such a novel multifunctional product includes an image information obtaining device that obtains image information, a document file storing device that stores the image information in a prescribed location as a document file, and a designating device that designates a prescribed terminal to receive a document file. A file transmission device is provided to transmit the document file to the terminal simultaneously when the document file storing device stores the image information in the document file.

In another embodiment, a multifunctional product communicates data with other multifunctional products over a network using a prescribed communications protocol. An electronic mail transmission device is provided to transmit an electronic mail to a multifunctional product designated by the designating device with confidential link information having partial location information related to a location of the document file. A table listing full location information is provided to enable the other multifunctional product to access a corresponding document file. The other multifunctional product identifies corresponding full location information based on the partial location information and downloads the document file by accessing the document file storing device using the corresponding full location information.

In yet another embodiment, the document file is provided with an attribution indicating if image information of the document file is disclosed. The network multifunctional product requests authorization information when the document file having the attribution representing that image information is not disclosed is accessed.

In yet another embodiment, the attribution is attached to the document file when the document filed is made.

In yet another embodiment, the other multifunctional product executes communications in accordance with the confidential link information when accessing the document file storing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIGS. 8A to 8E collectively illustrate exemplary registration information, an exemplary mail destination, an exemplary facsimile destination, an exemplary group destination, and an exemplary file destination;

FIGS. 9A to 9D illustrate an exemplary network path of a file destination, an exemplary local path of a file destination, an exemplary case name and body context, and an exemplary document name and user;

FIGS. 10A and 10B illustrate exemplary preset information and an exemplary reading condition;

FIGS. 11A and 11B collectively illustrate an exemplary image processing condition;

FIGS. 12A and 12B collectively illustrate an exemplary transmission/storage condition one touch button;

FIG. 13 illustrates an exemplary printing condition one touch button;

FIGS. 15A and 15B illustrate exemplary personal system setting information and exemplary fundamental setting, respectively;

FIGS. 20A to 20C illustrate exemplary system setting information and an exemplary network setting, respectively;

FIGS. 21A and 21B illustrate an exemplary mail setting;

FIGS. 25A and 25B illustrate an exemplary personal menu screen and an exemplary storage documents screen, respectively;

FIGS. 26A and 26B illustrate an exemplary storage documents screen and an exemplary destination designation screen, respectively;

FIGS. 27A and 27B illustrate an exemplary return mail designating screen and an exemplary case name-designating screen, respectively;

FIGS. 29A and 29B illustrate an exemplary transmission option selecting screen and an exemplary file transmission link address-selecting screen, respectively;

FIG. 30 illustrates an exemplary transmission option-selecting screen after each of items has been designated;

DESCRIPTION OF THE PREFERRED EMBODIMENTS

Figure 1:
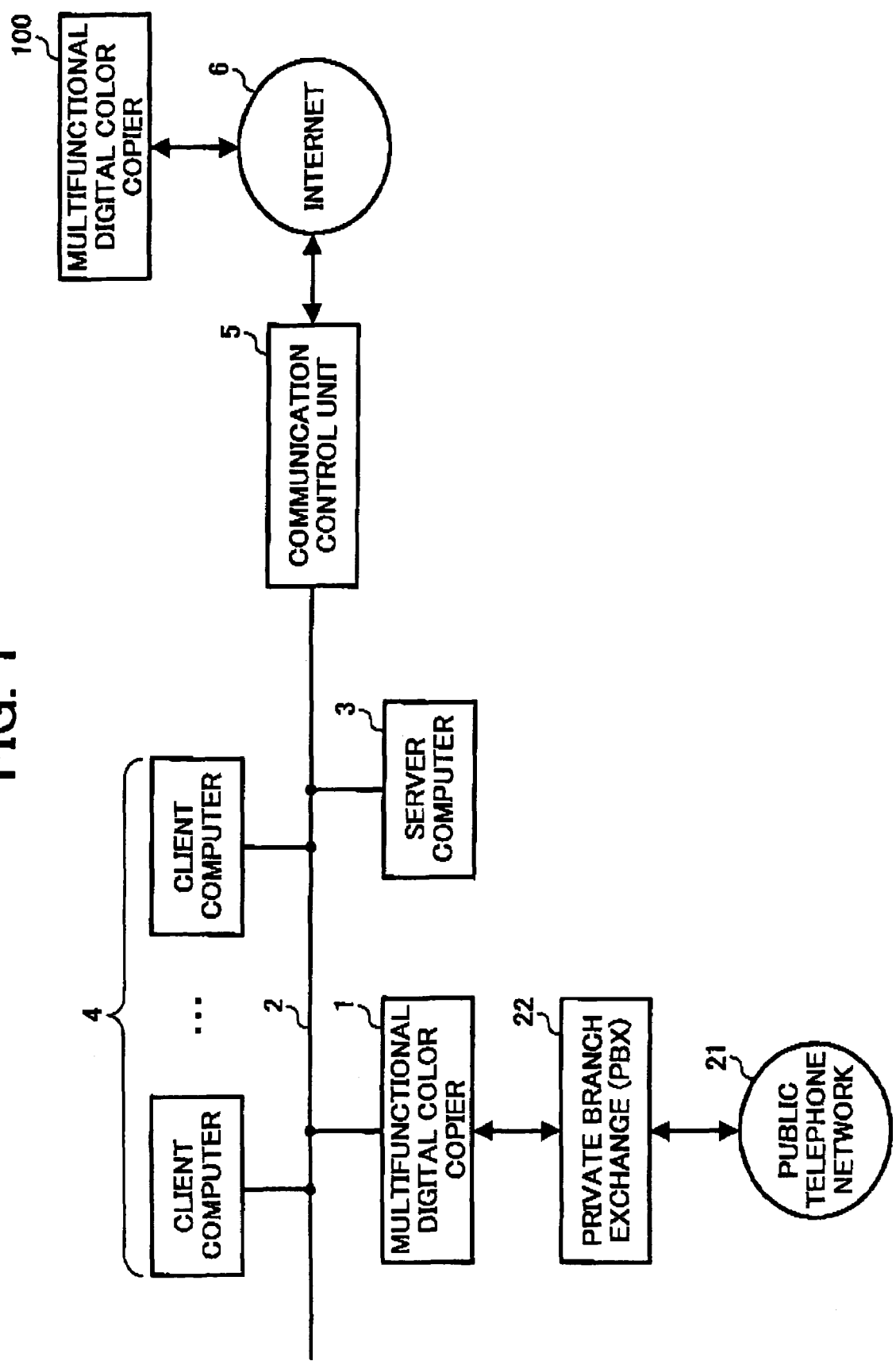
FIG. 1 illustrates an exemplary system including an exemplary multifunctional product according to one embodiment of the present invention.

Referring now to the drawing, wherein like reference numerals designate identical or corresponding parts throughout the several views, in particular in FIG. 1, an exemplary system including a multifunctional product 1, e.g. a multifunctional digital color copier, is illustrated according to one embodiment of the present invention. The multifunctional product 1 includes various functions of copying, making facsimile, printing, scanning, and distributing an image obtained by the scanning, printing, and making facsimile.

A server computer 3, which processes various information, and a plurality of client computers 4 are connected to the multifunctional product 1 via a local area network (LAN) 2 that serves as a communications network in the system. The server computer 3 supports FTP and HTTP protocols and functions as a Web server and a DNS (Domain Name Server), for example.

Specifically, an environment is established in the system such that various functions of the multifunctional product 1, such as inputting (e.g. a scanner function), outputting (e.g. a print function), processing (e.g. storing an image) an image, etc., can be shared on the LAN 2. The system is connected to the Internet 6 via a communications control unit 5, and an external environment such as another multifunctional digital color copier 100 via the Internet 6 to communicate data therebetween.

The communications control unit 5 includes a router, an exchanger, a MODEM, and a DSL MODEM or the like. However, another equipment can be employed if it can execute TCP/IP communications. The LAN 2 is not limited to wired communications, such as optical fiber, and can employ wireless communications, such as an infrared light, an electric wave, etc.

Figure 2:
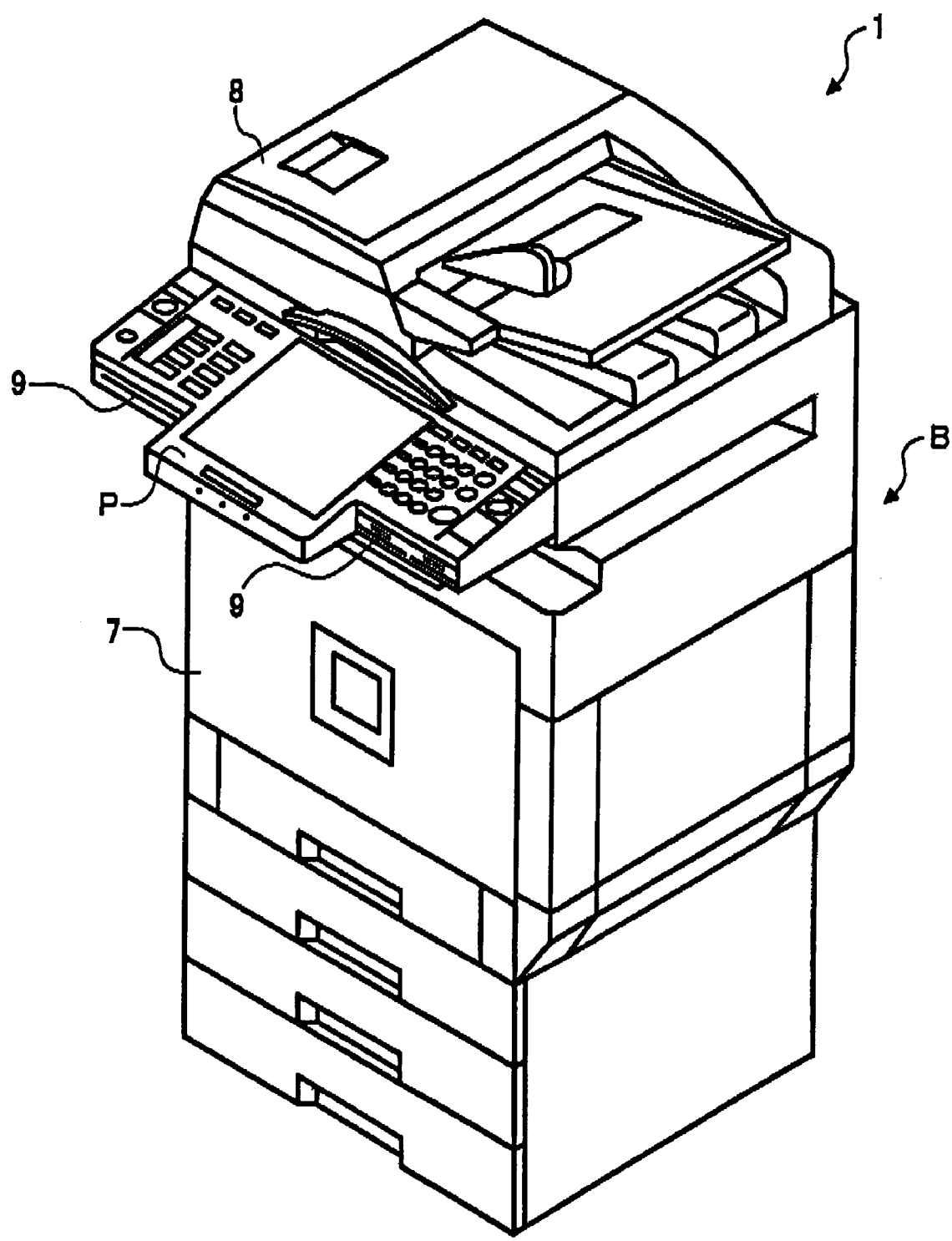
FIG. 2 illustrates the multifunctional product of FIG. 1.

Now, the multifunctional product 1 is described in detail with reference to FIG. 2.

As shown, the multifunctional product 1 includes a printing apparatus 7 that forms an image on a medium such as a transfer sheet, and an image reading apparatus 8 arranged above the printing apparatus 7 to read an image from an original document.

An operational panel P is provided on the surface of the image reading apparatus 8 to display information to an operator and allow the operator to input various settings, such as function setting, etc.

Figure 3:
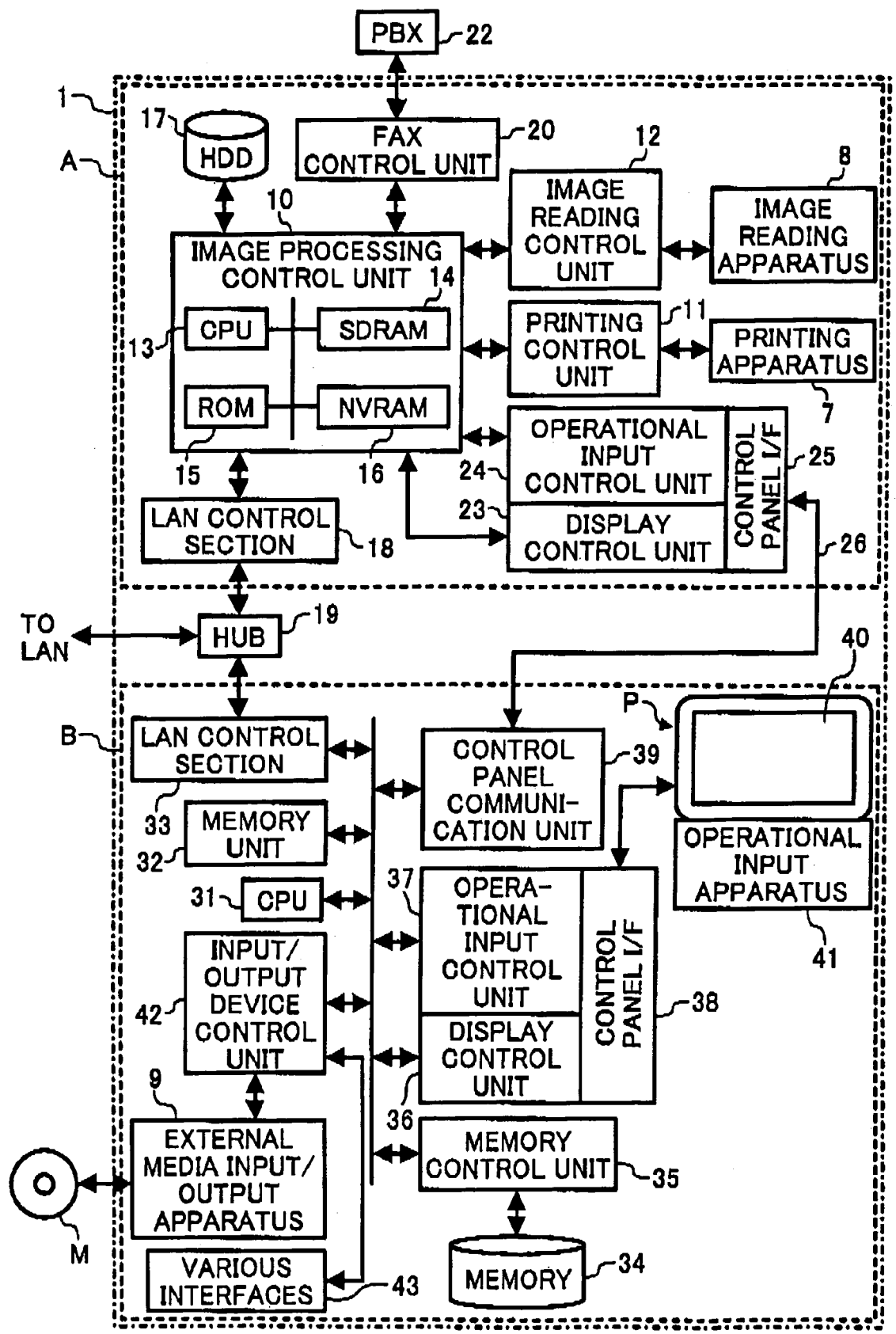
FIG. 3 illustrates exemplary electric connections in a multifunctional product.

An external media inputting-outputting apparatus 9 is provided beneath the operational panel P to read and write program code and image data or the like from and to a memory medium M, such as an optical disc, a flexible disc, etc., as illustrated in FIG. 3. An insertion inlet is provided and appears from the external media inputting-outputting apparatus 9 to allow insertion of the memory medium M.

The multifunctional product 1 is roughly divided into an image processing unit section A and an information processing unit section B serving as a computer that executes various information processing. The printing apparatus 7 and the image reading apparatus 8 belong to the image processing unit section A, while the operational panel P and external media inputting outputting apparatus 9 belong to the information processing unit section B.

Now the image processing unit section A is described in further detail with reference to FIG. 3.

The image processing unit section A includes an image processing control unit 10 that generally controls image processing executed therein and the image reading apparatus 8. A printing control unit 11 that controls the printing apparatus 7, and an image reading control unit 12 that controls the image reading apparatus 8 are connected to the image processing control unit 10.

The printing control unit 11 outputs a printing instruction together with image data to the printing apparatus 7 under control of the image processing control unit 10, and causes the printing apparatus 7 to form and output an image on a medium such as a transfer sheet. The printing apparatus 7 is enabled to execute full-color printing using various printing systems, such as an ink jet system, a dye sublimation thermal transfer system, a silver photographic system, a direct thermal printing system, a melting type thermal transfer system, etc., beside an electro-photographic system.

An image reading control unit 12 is controlled by the image processing control unit 10 to drive the image reading apparatus 8 and converge a light irradiated and reflected from a surface of an original document at a light acceptance unit such as a CCD (Charge Coupled Device) via a mirror, lens, etc. The image reading control unit 12 then reads and executes A/D conversion, and then generates digital image data of RGB each with eight bits.

Such an image processing control unit 10 is formed from a microcomputer, in which a CPU (Central Control Unit) 13 serving as a main processor, a SDRAM (Synchronous Dynamic Random Access Memory) 14 that temporarily stores image data read from the image reading apparatus 8 to be used in image formation of the printing apparatus 7, a ROM (Read Only Memory) 15 that stores control program or the like, and a NVRAM 16 that maintains system log, system setting, and log information or the like when power supply is turned off, are connected to each other through a bus.

Further, a HDD (i.e., a magnetic disc apparatus) 17 serving as a memory that stores masses of image data and job career or the like, a LAN control section 18 that connects the image processing unit section A to the LAN 2 via a hub 19 that serves as a wire correcting apparatus for an interior LAN arranged within an apparatus, and a facsimile control unit 20 that controls a facsimile are connected to the image processing control unit 10.

The facsimile control unit 20 is connected to a private branch exchange (PBX) 22 connected to a public telephone line network 21 (see FIG. 1). The multifunctional product 1 is enabled to communicate with a remote facsimile apparatus via a public telephone line network 21.

In addition, a display control unit 23 and an operation input control unit 24 are connected to the image processing control unit 10. The display control unit 23 outputs an image display control signal to the information processing unit section B via a communications cable 26, connected to a control panel interface 25, under control of the image processing control unit 10, to control the operation panel P to display an image.

Further, the operation input control unit 24 inputs control signals, generated in accordance with function settings and inputting operations executed by an operator through the operational panel P via a communications cable 26, which is connected to the control panel interface 25, under control of the image processing control unit 10.

Specifically, the image processing unit section A is enabled to directly monitor the operational panel P via the communications cable 26.

Accordingly, the image processing unit section A is enabled to utilize the operational panel P by connecting the communications cable 26 to an image processing unit included in a conventional image processing apparatus.

Thus, the display control unit 23 and the operation input control unit 24 operate as if they are connected to the operational panel P.

In accordance with such a configuration, the image processing unit section A analyzes printing data as image information transmitted from an external point such as a server computer 3, a client computer 4, a facsimile apparatus, etc., as well as a command that instructs printing.

The image processing unit section A generates a bit map to print printing data (i.e., an output image data), and analyzes the command to determine a printing mode and an operation. The image processing unit section A receives and operates in accordance with printing data and a command via the LAN control section 18 or the facsimile control unit 20.

Further, the image processing unit section A transfers printing data stored in the SDRAM 14 and HDD 17, document reading data, output image data processed for output use, and compression data generated by compressing these data to an external apparatus such as a sever computer 3, a client computer 4, a facsimile, etc.

Further, the image processing unit section A transfers image data read by the image reading apparatus 8 to the image processing control unit 10, and corrects signal deterioration caused by an optical system and quantization to a digital signal, and writes the image data in the SRAM 14. The image data stored in the SDRAM 14 in this way is converted into output image data in the printing control unit 11, and is output to the printing apparatus 7.

Now, the information processing unit section B employing the operational panel P is described in detail with reference to FIG. 3 again.

The information processing unit section B is formed from a microcomputer controlled by a multipurpose OS (Operational System), which is generally used in an information processing apparatus called a personal computer. The information processing unit section B includes a CPU 31 serving as a main processor, a memory unit 32 formed from a RAM, which provides a working space for the CPU 31, and a ROM, which is connected to the CPU 31 via a bus and stores a start up program or the like as a read only memory. Also included and connected to the CPU 31 via the bus is a memory apparatus control unit 35 to control inputting and outputting of data to and from the memory apparatus 34 such as a HDD, which stores an OS, application program, and so on.

Further included and connected to the CPU 31 is a LAN control section 33 serving as a communications interface, which connects the information processing unit section B to the LAN 2 via the hub 19. An IP address assigned to the LAN control section 33 as a network address is different from that assigned to the LAN control section 18 of the above-mentioned image processing unit section A.

Specifically, two IP addresses are assigned to the multifunctional product 1 according to the preferred embodiment.

Stated differently, both of the image and information processing sections A and B are connected to the LAN 2, and are enabled to communicate data with each other.

Since the multifunctional product 1 is connected to the LAN 2 via the hub 19, it appears as if only one IP address is assigned. Accordingly, the aesthetics are not spoiled, and wire connection or the like can be implemented easier.

Further, the display control unit 36 that controls the operational panel P and the operation input control unit 37 are connected to the CPU 31.

Figure 4:
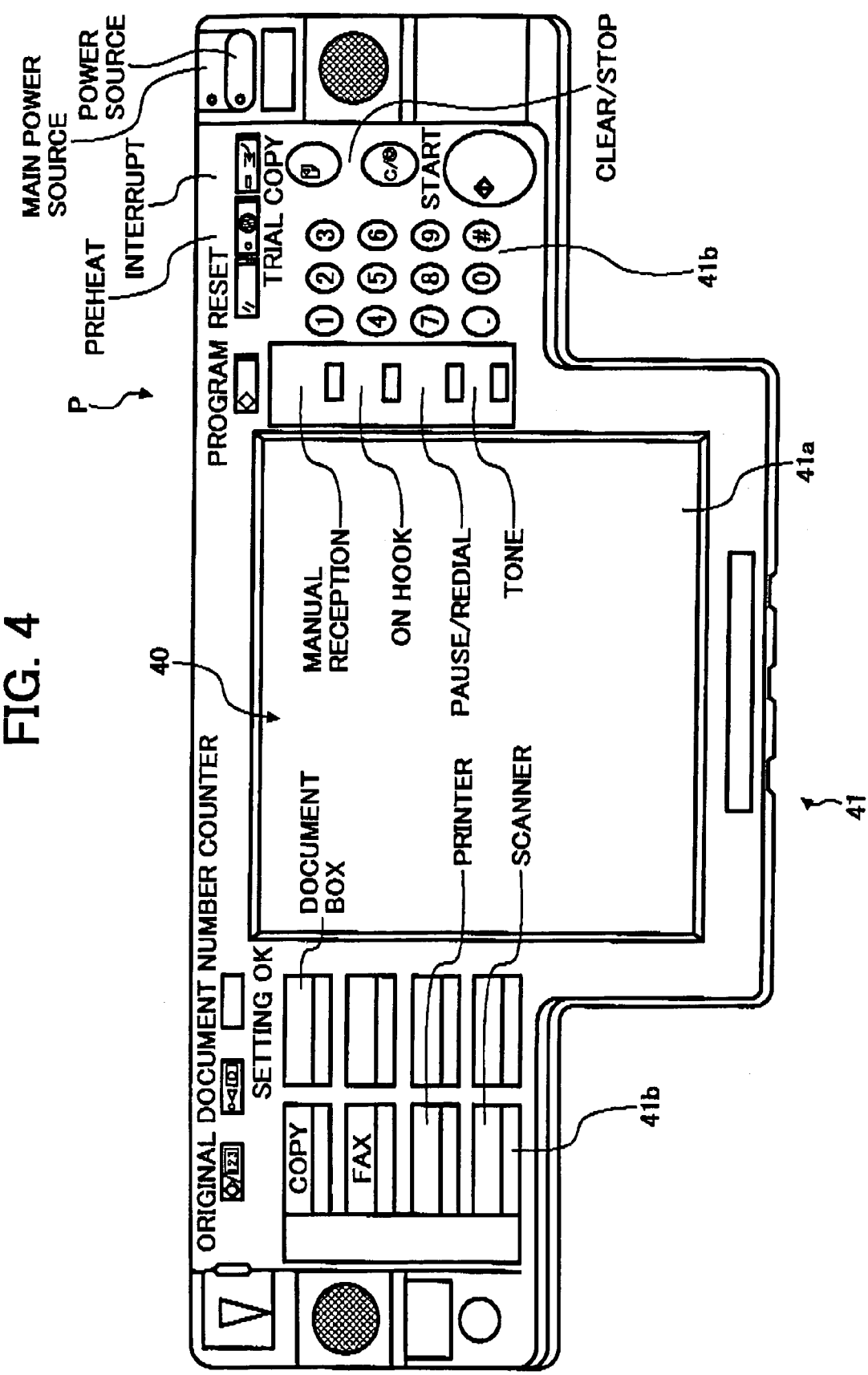
FIG. 4 illustrates an exemplary operational panel employed in a multifunctional product according to one embodiment of the present invention.

As shown in FIG. 4, the operational panel P includes a display apparatus 40, formed from an LCD (Liquid Crystal Display) and an operation input apparatus 41. The operation input apparatus 41 includes a touch panel 41a, which employs a supersonic elastic wave system or the like laminated on the surface of the display apparatus 40, and a keyboard 41b having a plurality of keys.

The keyboard 41b includes a start key for declaring commencement of image reading, ten pad keys allowing numeric input, a reading condition setting key for setting a transmission destination of read image data, and so on.

Specifically, again in FIG. 3, the display control unit 36 outputs an image display control signal to the display apparatus 40 via a control panel interface 38 and controls the display apparatus 40 to display prescribed items in accordance with the image display control signal. Further, an operation input control unit 37 receives function settings from an operator through the operation input apparatus 41 as well as an input control signal generated in accordance with an inputting operation via the control panel interface 38.

In addition, a control panel communication unit 39, which is connected to the control panel interface 25 via the communication cable 26, is connected to the CPU 31. The control panel communication unit 39 receives an image display control signal from the image processing unit section A, and transfers function settings from an operator through the operational panel P, as well as an input control signal generated in accordance with an inputting operation to the image processing unit section A.

The image display control signal then undergoes data conversion processing for use in the display apparatus 40, and is output to the display control unit 36. Further, function settings through the operational panel P and an input control signal, generated in accordance with an inputting operation, undergo data conversion processing to be in a format suitable for a specification in the image processing unit section A, and are then input to the control panel communication unit 39.

As mentioned above, operation systems and application programs are implemented by the CPU 31 and stored in the memory apparatus 34. Thus, the memory apparatus 34 functions as a memory medium that stores application programs.

When a user turns on and supplies power to this multifunctional product 1, the CPU 31 initiates the start up program of the memory unit 32, and reads and stores OS of the memory apparatus 34 in the RAM, thereby starting the OS. The OS starts programs and reads and preserves information in accordance with operations of a user. Series of Windows (TM (herein below the same)) are employed as an OS. Further, an operational program running on these operation systems is called an application program. An OS operating in the information processing unit section B is the same sort to that operating in an image processing apparatus, such as a server computer 3, a client computer 4, etc., and accordingly is a multipurpose OS (e.g. Windows, etc.).

Further, the above-mentioned external media input/output apparatus 9 includes one of a flexible disc drive apparatus, an optical disc drive apparatus, a MO drive apparatus, a media drive apparatus, or the like, to read and write program code and image data from and to a memory medium M, such as a flexible disc, a hard disk, an optical disc (e.g. a CD-ROM, a CD-R, a CD-RW, a DVD-ROM, a DVDRAM, a DVD-R, a DVD+R, DVD-RW, A DVD+RW), an optical disc (MO), a semiconductor media, etc., which stores operation systems, various device drivers, various program codes (control programs), such as an application program, image data, etc. An input output device control unit 42 connected to the CPU 31 via a bus controls the external media input/output apparatus 9.

Accordingly, an application program to be stored in the memory apparatus 34 can be one recorded in the memory medium M and installed therefrom. Thus, the memory medium M serves as a memory medium that stores an application program. Further, the application program can be externally taken in and installed in the memory apparatus 34 via the Internet 6 and the LAN 2, for example.

Various interfaces 43, such as USB, IEEE1394, SCSI, etc., are connected to the input output device control unit 42, and allow connections of various instruments, such as a digital camera, etc., to the input/output device control unit 42.

Hereinbelow, typical operations executed in the multifunctional product 1 will now be described.

Since the image and information processing unit sections A and B are enabled to execute different operations, independently, the information processing unit section B can receive an electronic mail even when the image processing unit section A is reading an image. Since respective operations do not affect one another, no problem occurs even if these image and information processing unit sections A and B independently operate.

However, each of the functions and its result of the image processing unit section A can be used and processed by a program that operates in the information processing unit section B.

For example, text documents sometimes are obtained by processing document image data, which is read by the image reading apparatus 8, using prescribed character recognition software. To execute such processing, a background multifunctional product is necessitated to transmit data as a processing objective to an external computer (e.g. a PC) including character recognition software to cause the data to be processed by the computer. Otherwise, the image-processing unit section A needs to provide character recognition software running in the image processing control unit 10.

As one of problems possibly caused in such situations, processing cannot be executed as needed unless the external computer is always provided in the former situation. Further, running the multipurpose application software in a system, which is specialized in processing an image, decreases a primary processing performance expected to a multifunctional product in the latter situation. Also, private software development is needed in the latter situation, because most commercially available software, such as a word processor, a voice recognition, etc., cannot operate in relation to an operating system.

Figure 5:
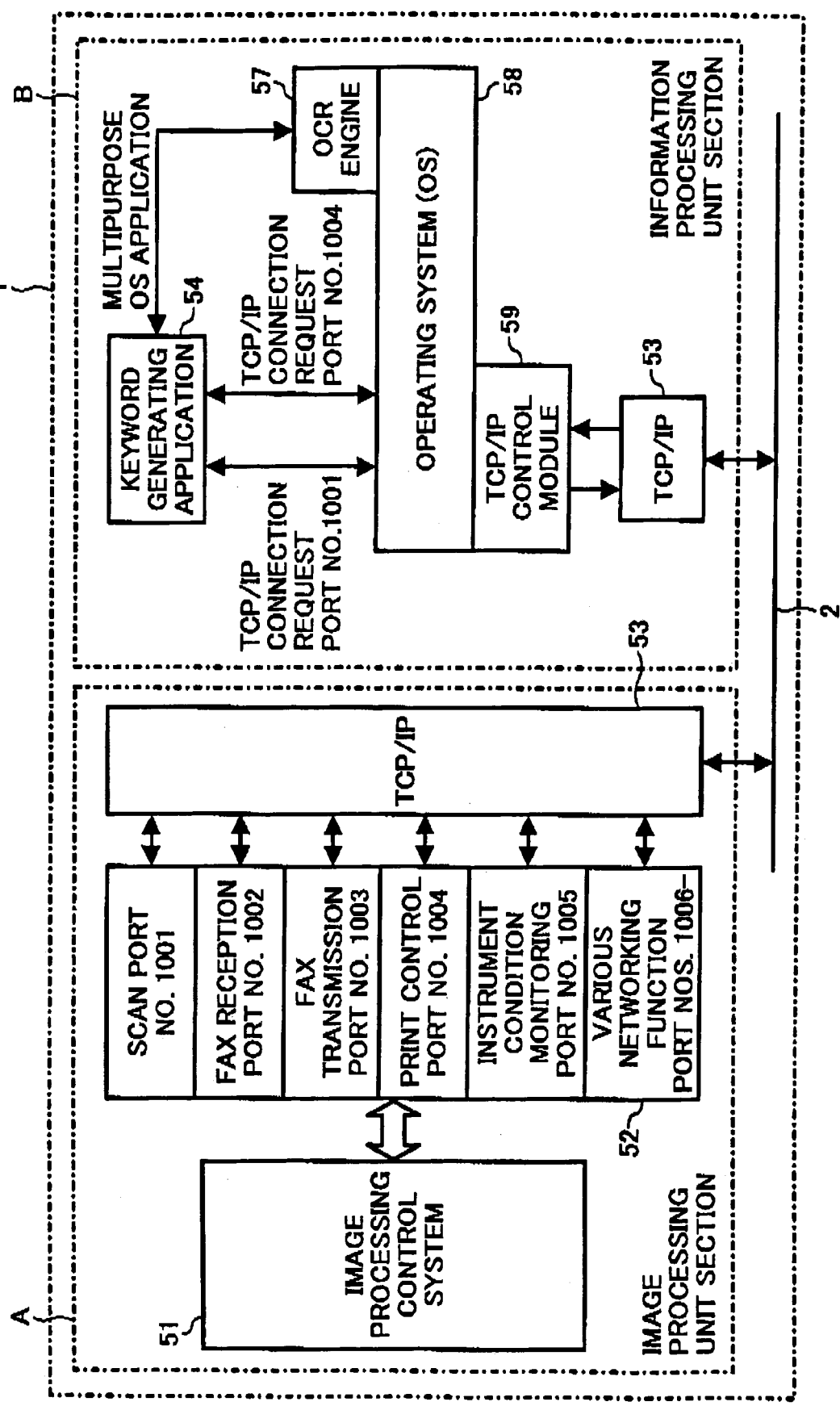
FIG. 5 illustrates an exemplary processing module employed in a multifunctional product.

To resolve such problems, a commercially available OS 58 such as Windows as shown in FIG. 5 is employed and operates in the information processing unit section B to avoid an adverse influence from an operation of the image processing unit section A.

However, if the both are always mutually independently operating from one another, the above-mentioned goal cannot be achieved. Then, according to the multifunctional product 1, functions of the image processing unit section A can be utilized by running a program that is formed by combining processing modules as illustrated in FIG. 5.

A processing module will be now described with reference to FIG. 5.

As shown, modules of the image processing control system 51 includes a program that controls primary functions of the multifunctional product 1. The multifunctional product 1 includes an interface that interfaces with a networking function module 52, which can be accessed via a network (LAN 2) only from the information processing unit section B.

The networking function module 52 enables usage of a function, such as a scanning function, a facsimile receiving function, etc., which is included in an ordinary multifunctional product to be executed by the image processing control system 51, via the network (LAN 2). However, the networking function module 52 cannot be used from the image processing unit section A.

The networking function module 52 is designed such that a processing module having a corresponding function starts when the TCP/IP (Transmission Control Protocol/Internet protocol) 53 detects a request for connection to a corresponding port number.

For example, when a request for connection to a port number 1002 occurs, a module with a facsimile communications function starts. The module starts and operates in cooperation with a processing request sent from a connection requesting origin, and returns a necessary response.

Now, a feature of a program used in the information processing unit section B will be described with a keyword generating application 54 as one example.

The keyword generating application 54 applies character recognition processing to read image data and creates a keyword based upon the character recognition result.

The entire information processing unit section B is operated by each of applications under control of the OS 58.

Further, each of the application software is a module formed from a part of software and uses various functions provided by the OS 58. Specifically, each of them is called out and is controlled to execute necessary processing by program. A TCP/IP control module 59 executes a function included in the OS 58 as a standard attachment to communicate with other terminal apparatuses connected via the TCP/IP 53.

Further, independent software, which is built-in to be used by the other applications, can be used. For example, an OCR engine 57 only applies character recognition processing to image data. It is used as one of parts (i.e., a module) of the other software without operating by itself.

Thus, since each of application programs operate under control of the OS 58 in the entire information processing unit section B, application programs can be developed while combining one or a plurality of these functions.

However, an existing technology cannot directly use a function of an image processing unit section A with such a device.

To address that situation, the multifunctional product 1 employs the image processing unit section A to execute an original function of a multifunctional product, as well as the information processing unit section B, which is internally connected to the image processing unit section A via the network (i.e., LAN 2), to execute an application using the network protocol (TCP/IP 53).

Since the connection is only physically achieved, a function of the image processing unit section A cannot be used from an inside of application software that runs in the information processing unit section B, even if data can be mutually communicated between the image and information processing unit sections A and B simply using the existing technology.

Now, a device capable of using a function of the image processing unit section A from an inside application software, which operates in the information processing unit section B, will be described.

For example, image data read from the image reading apparatus 8 controlled by the image processing unit section A can be a character recognition objective when a keyword generating application software 54 operates.

To instruct the image reading apparatus 8 to read an image, a TCP/IP connection request is to be sent to the image processing unit section A while designating a port number 1001. Further, data indicative of processing contents is simultaneously transmitted in a data stream. A function designated by the port number 1001 represents that the image reading apparatus 8 reads an image, and an optional file name is assigned to the read image data, and is transferred to the information processing unit section B. Such processing details are predetermined, and port numbers are assigned to them to be used separately.

In this way, functions of the image processing unit section A can be used by the keyword generating application 54.

Further, other systems can be used as a communications protocol beside the TCP/IP.

Now, the multifunctional product 1 fundamentally includes various functions of scanning, media, document and page browsing, image processing, form synthesizing, transmitting and storing, printing, optical card reading, retrieving, making a facsimile, acting as mail and Web servers, periodically executing, system monitoring, achieving security, career and status displaying, and personal and administrator use setting, or the like.

The scanning function reads and transmits a sheet original document in a form of an image file as a mail, a facsimile, or a file transmission (e.g. Windows sharing folder, FTP and Web folders, external server). Otherwise, it can be internally stored.

The media browser function can browse various files stored in the memory medium M. When set on the network as (hypothetical) sharing medias in the personal setting, FTP and Web folders or the like can be browsed in a similar operation executed to a media.

Further, the document browser function can operate and browse a block of document files, such as a general document storage (e.g. a temporary storage), a reception mail (a storage of images attached to a reception mail), a reception facsimile (a facsimile image storage), etc. A document administrative function is included and can change and delete a name and a document, respectively. The storage documents allow retrieval of an OCR character within an image, and download from the Web or the like.

Further, the page browser function exists in a storage document screen or a screen for confirming a transmission/printing (read/selection) image to display an image included in a HDD of the multifunctional product. The page browser function can execute transmitting, storing, and a selection function for selecting and printing an image file, as well as inspecting and editing various information of a file.

The image processing function includes an automatic image processing function of enabling image processing before transmission, storage, and printing. The automatic image processing function enables quality correction, rotation, color subtraction, clipping, blank removal of an image, and so on.

Further, the form synthesizing function selects positional information (e.g. a form) having a background, to which a text or an image is attached, and synthesizes and creates a new image before the transmission, storage, and printing. A transmission image and a printing subject can be formed with various layouts in cooperation with a form-creating tool.

Further, the transmission and storage function can transmit an image and a file obtained by scanning a sheet original document or selected by media, document, and page browsers to a designated destination, a sharing/FTP/Web folder on a network, and an external server, respectively, by mail or facsimile. When stored, an image undergoes OCR and a line string retrieval. Such an image can be downloaded from a Web.

The printing function prints out an image and a file selected by the media and document browsers while designating various layouts.

Further, the OCR function extracts a text by applying OCR to an image by scanning a sheet original document and a reception facsimile image. The OCR function includes functions of forming, transmitting, and storing a PDF file (i.e., an image PDF plus an OCR) to which a text is embedded, an OCR text retrieving function exerted at a time of storage, and an OCR destination/document name function that uses a character string given the OCR as a destination/document name. An OCR destination can be selected if having an OCR character string in a designated region in accordance with a registration destination. The OCR character string in a designated region is regarded as the OCR document name.

The retrieving function extracts and displays a file, such as an image/file stored or existing on the network based on a keyword, such as a document name/a file name, storage date/change date, an OCR text, etc. An objective of OCR text retrieval is a character string created when the OCR is applied to an image.

The facsimile function creates an image file from a reception image information received from three facsimile ports (i.e., facsimile communication ports; G3-1, G3-2, G4-1), which are provided by the multifunctional product 1. The facsimile function then stores, distributes, and transmits the image file as a mail transfer or file transfer, or the like. A transmitting origin and a destination of a reception facsimile is distributed in accordance with initial setting and a reception port, respectively. The facsimile function also transmits an image file created from a sheet original document, a media, and a storage by facsimile. Further, the facsimile function transfers an image attached to a reception mail to another facsimile apparatus.

The mail server function includes various functions of transmitting a mail, internally generating and maintaining guest and personal use mail addresses (at a time of setting SMTP), automatically printing an image attached to a reception mail, transferring a facsimile, performing transmission and storage by a one touch button operation, and returning an operation result mail to a transmitter.

Some operational combinations of reception mail addresses are provided as defaults per a guest/person, and setting and changing thereof are executed by the personal setting.

Since a mail address display name is assigned to a mail address of an external mail server when POP reception is set, a similar operation can be performed to when the SMTP is set. To manage various mail environments, SMTP authorization and "POP before SMTP" modes are employed in mail transmission. APOP is employed for mail reception.

The Web server function provides URLs for guests and persons, browses, retrieves, downloads, uploads, transmits, stores, and prints internally stored images or files. Further, the Web server function refers to an operation result, and sets person and administrator settings. The Web server function handles SSL server authorization while giving security during communications.

The periodical executing function deletes storage of preservation overdue, receives a POP mail, updates LDAP, automatically prints and deletes career, and automatically restarts.

The system monitoring function detects abnormality occurring at a disc full or within an apparatus interior, as well as tray or door open information and sheet jam or the like. The system monitoring function then displays a screen having status messages or the like (e.g. a service person call (a screen)). The system monitoring function deals with an accounting apparatus that monitors and restricts usage of a user.

To protect data from an unfair manipulation of a chance user (e.g. a guest user) and that through an external network, the security function achieves security, such as a personal authorization, an administrator password, a mail transmission authorization, APOP, Web's SLL server authorization, access restriction, etc., for an operation section user and the network.

Further, a career/condition display function confirms if results of communications of a mail, a facsimile, and a file, and printing are normal, as well as a date of execution/completion. Further confirmed by the career/condition display function is execution of job cancellation, and contents of an error occurring at the time of execution.

Further, a personal setting function enables registration of an environmental setting, such as destination registration of a mail address, customizing of a screen/operation, setting of a reception mail address, etc., per a person while preventing the other person from finding a usage environment of a personal user. A number of persons possible to be set are, e.g., a thousand.

Further, an administrator use setting function executes various settings, such as a network setting function, a time setting function, an automatic restarting time setting function, for a guest user, a fundamental function used when each of the functions is operated, and an administrative function, such as a user administration function, a mail environment setting function, a reception facsimile setting function, etc.

Figure 6:
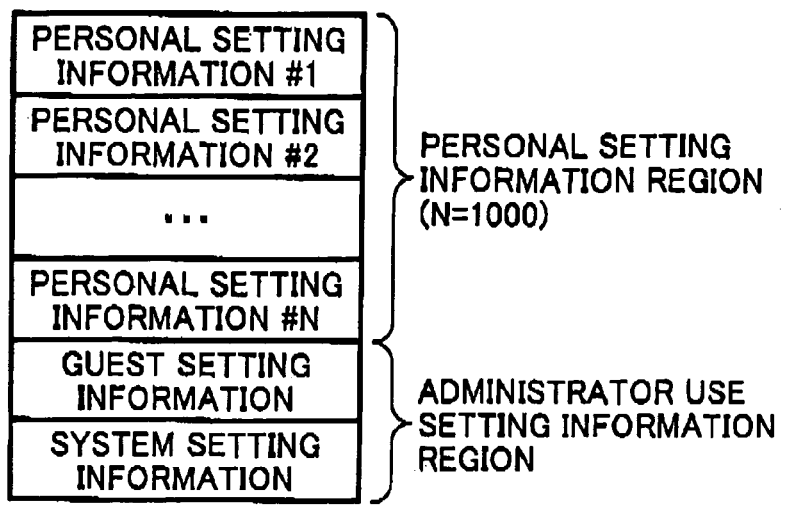
FIG. 6 illustrates exemplary information regions registered in an information-processing unit B provided in a multifunctional product 1.

To realize such various functions, the information processing unit B includes, as shown in FIG. 6, "personal setting information" regions capable of registering a thousand of personal setting information (#1 to #N), and an administrator use setting information region capable of registering "guest" and "system setting information".

Now, exemplary information of personal setting, guest setting, and system setting are now specifically described. Since contents of the guest setting information are essentially the same as those of the personal setting information, only different portions are described for clarity.

Figure 7A:
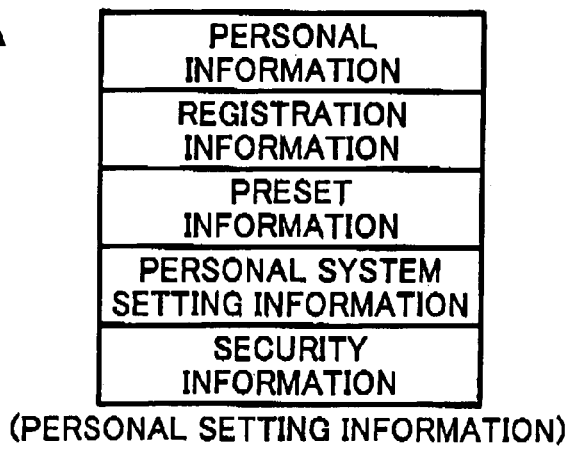
FIGS. 7A and 7B illustrate an exemplary personal setting information and an exemplary personal information, respectively.

As shown in FIG. 7A, the personal setting information includes "personal information" for identifying a person, "registration information" for registering a mail destination per a person, "preset information" for registering various condition setting information per a person, "personal system setting information" for preserving initial setting or the like used when the multifunctional product 1 is used, and "security information" for registering information related to security.

Figure 7B:
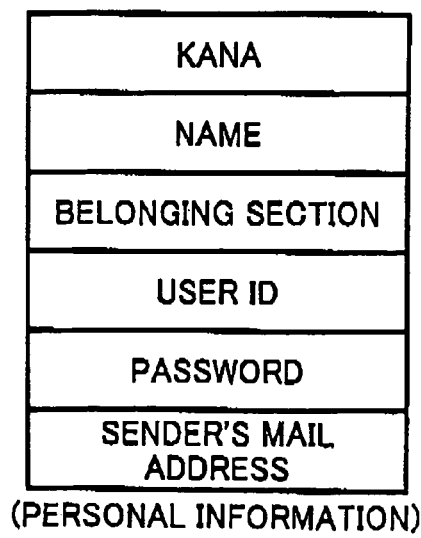

As shown in FIG. 7B, the personal information includes "Kana", a "name", a "belonging section", a "user ID" for identifying each person, a "password" used in authorization, and a "sender's mail address", or the like Only a name unique in a system of the multifunctional product 1 can be set. For example, the name is used as a title of a personal menu and forms a character string representing each user.

The user ID is used when an operation starts and a guest menu (e.g. an initial setting condition) transits to a personal menu. The user ID is also used in a personal menu use URL (e.g. http://name/user ID) of a Web, as well as a reception mail address (e.g. print. user ID @ host name. domain name) or the like.

The sender's mail address is a character string set in a so called "from field" at the time of mail transmission, and is automatically set as a default in response to setting of mail reception protocol of administrator use setting.

For example, when mail reception protocol is set to POP or APOP, a "(personal information) name, sender. User ID<POP mail address" is set as a default sender's mail address.

When the mail reception protocol is SMTP, a "(personal information) name, sender. user ID @ host name. domain name" is set as a default sender's mail address.

The "sender" is a default value (as mentioned later in detail) of a reception mail address of "01" error mail of a reception mailbox. Accordingly, when an error mail is transferred due to an unknown destination after mail transmission, the error mail is stored in an error mail portion of the reception mailbox.

As shown in FIG. 8A, registration information includes a hundred of cases of "mail destination" used when an electronic mail is transmitted, a hundred of cases of "facsimile (fax) destination" used when a facsimile is transmitted, a hundred of cases of "group destination", a hundred of cases of "file destination" used when a file is transmitted, a hundred of cases of case names set in a so called "subject field", or a "case name/body text" set to a body context of an electronic mail, and a hundred of cases of "document name/user name".

As shown in FIG. 8B, the mail destination includes a "name" to identify a "mail address", a "mail address", a "belonging section", and "transmission option designation" (do, do not). When the "transmission option destination" is set as positive (i.e., do), "Internet facsimile (fax) transmission" representing if an Internet facsimile is transmitted or not, a "SMTP server designating transmission" used when a SMTP server is designated, a "mail transmission authorization" (do, do not) that represents if authorization is executed or not when a mail is transmitted, and an "OCR destination designation" (do, do not) are included.

When the "mail transmission authorization" is set as positive, an "authorization type", an "authorization POP server address", an "authorization user name", and an "authorization password" are included.

Every file attached to mail destinations with a positive setting of the Internet facsimile transmission is converted into a network facsimile use image (TIFF-F) before transmission.

When the "OCR destination designation" is set as positive, and OCR causes an error or nothing hits in retrieving the address book, a document is transmitted to a registration mail address.

A mail destination can be registered in a mail address book by being obtained from a mail server by LDAP using an open address book function.

Figure 8C:
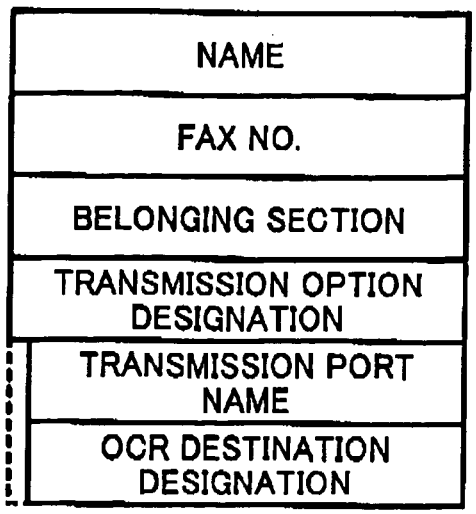

The facsimile destination includes a "name" to identify a facsimile destination, a "facsimile number (fax no.)", a "belonging section", and a "transmission option designation" (do, do not) as shown in FIG. 8C.

The same value cannot be registered in a personal facsimile destination for "the name (a personal destination)".

When the "transmission option designation" is set as positive, a "transmission port name", and an "OCR destination designation" (do, do not) are included. When the "OCR destination designation" is set as positive, and OCR causes an error or nothing hit in the address book, a document is transmitted to a registration mail address.

Figure 8D:
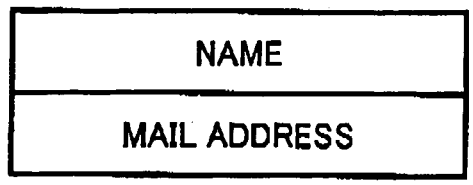

As shown in FIG. 8D, the group destination includes a "name" for identifying a group destination, and a "mail address" capable of receiving registrations of at least one mail destination name.

The same value of the "name" (group) cannot be registered in a personal group destination. Further, the same mail destination cannot be registered in one group.

Figure 8E:
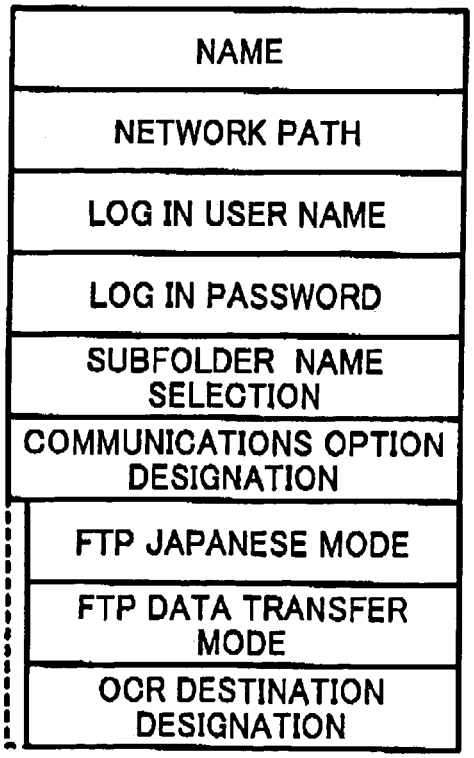

As shown in FIG. 8E, the file destination includes a "name" for identifying a file destination, a "network path" to which a value of a network path to be used when a file is transmitted to a Windows sharing/FTP/HTTP (e.g. an external server) folder on the network is registered, a "log in user name", a "login password", and a "subfolder name selection" to which a subfolder name to be formed in a host apparatus of a file destination is registered, and a "communications option designation" (do, do not).

When the "communications option designation" is positively set, a "FTP Japanese mode" (e.g. Sift JIS, EUC), a "FTP data transfer mode" (e.g. PORT mode, PASV mode), and an "OCR destination designation" are included.

A "network path" can include a local path as shown in FIG. 9B beside the network path shown in FIG. 9A An "external server plug-in" represents a function of transmitting a file to an external server and a sharing media designation in a similar imagery to a scheme of file, ftp, and http(s) in relation to various external servers without feeling a difference between interfaces. "Compact flash", "Smart media", "SD memory card", and "Memory stick" are trademarks (TM) owned by suppliers, respectively.

As shown in FIG. 9C, a case name/body context includes a "case name" or a "body context", to which a character string used as a case name or a body context of a mail is registered.

As shown in FIG. 9D, a document/user name includes a "document name", to which a character string used as a document name at a time of storage is registered, an "OCR" (do, do not), and a "user name", to which a format character string used as a user name or a document name, when a file is transmitted, is registered.

When the "OCR" is positively set and is fault, a registered document name is used.

As shown in FIG. 10A, preset information includes twelve reading conditions, twelve image processing conditions, twenty transmission/storage condition one touch buttons, twenty printing condition one touch buttons, twelve mail boxes, twelve sharing media addresses, and twelve file transmission addresses.

Such reading conditions, image processing conditions, and file transmission link addresses correspond to contents registered to preset buttons displayed on an operation screen. The transmission/storage and the printing condition correspond to contents registered through one-touch buttons also displayed on the operation screen. The reception mailbox, the sharing media address, and the file transmission link address are contents to be registered through a button icon displayed on the operation screen.

When each of the respective presetting and one touch buttons and button icons are operated, each of contents registered through those is applied to activity of an applicable operation objective and the activity is practiced.

As shown in FIG. 10B, a reading condition includes a "name" for identifying a reading condition on a preset button, an "icon" for designating an icon for display of a thumbnail image of a reading condition on a preset button, a "display/absence" for designating if a reading condition is displayed (when displayed, designation of a displaying manner is included), an "original document type" (e.g. a mono chrome character or a picture, a gray scale, a full-color) for designating a type of an original document, an "image quality" (selectable from nine steps of from compression priority to image quality priority) for designating a reading image quality, a "resolution" (100, 200, 300, 400, and 600 dpis) for designating a reading resolution, a "reading density" (automatic density or one of seven grades of manual density) for designating a reading density, a "reading size" (e.g. automatic size detection, a standard size, a non-standard size) for designating a reading range on a read original document, a "standard size", an "amorphous form", a "frame erase" (do, do not) for designating a condition that a frame area of a reading range designated in view of a reading size is erased, and a "duplex reading" for designating if a duplex reading is executed.

When the "reading size" has a value other than the "automatic size detection", a designated value is set to the next "standard size" or the "amorphous form".

As shown in FIGS. 11A and 11B, an image processing condition includes a "name" for identifying an image processing condition on the preset button, an "icon" for designating an icon for display of a thumbnail image of the image processing condition on the preset button, a "display/absence" for designating if an image processing condition is displayed (when displayed, designation of a displaying manner is included), an "image quality correction" (do, do not) for designating if an image quality is corrected, a "rotation" (do, do not) for designating if an image is rotated, a "color subtraction/into monochrome process" (do, do not) for designating if color subtraction or monochrome process is executed, a "clipping" (do, do not) for designating if an image is clipped, and a "white sheet removal" for designating if a white sheet is removed.

When the "image quality correction" is positively set, a "page number designation" for designating a page number to which image quality correction is applied, and an "automatic image quality correction" (automatic, manual) for setting a content of image quality correction are included. When the "manual" is set to the "automatic image quality correction", "brightness", "contrast", "clearness", and "hue" serving as image quality correction items are included.

When the "rotation" is positively set, a "page number designation" for designating a page number to which a rotation processing is applied, and a "rotational direction" for designating a rotational direction are included.

Further, when the "color subtraction/into monochrome" is positively set, a "page number designation" for designating a page number to which a color subtraction or monochrome process is applied, a "number of colors" for designating a number of colors remaining after color is subtracted, a "dropout color" (non-color, red, blue, green, color) for designating a dropout color, a "subtract only character color" for designating if only a character color is subtracted or monochrome processing is applied, and a "resolution without character" (e.g. 1/1, 1/2, 1/4) for designating if resolution of an image, which has undergone the color subtraction, is changed are included.

When the "clipping" is positively set, a "page number designation" for designating a page number to which clipping processing is applied, a "clip region" (selected from among form data of existing and that preserved by designating a region of a read or selected image) for designating an image region in which clipping processing is performed, an "original image" (e.g. leave over/not leave over, addition before or after an original image) for designating a processing of the original image, and a "resolution of original image" (1/1, 1/2, 1/4) for designating resolution of the original image when the original image are left over.

When the "white sheet removal" is positively set, a "page number designation" for designating a page number to which white sheet removal processing is applied is included.

As shown in FIGS. 12A and 12B, a transmission/storage condition one touch button includes a "name" for identifying a transmission/storage condition on a one-touch button, a "character size" for designating a character size to be applied when a name is displayed on a one touch button, an "icon" for designating an icon for displaying a thumbnail image of the transmission/storage conditions on the one touch button, a "display/absence" for designating if transmission/storage one touch button is displayed (including designation of a displaying manner, when displayed), one to a hundred of "address" including at least one destination address used in mail transmission, a "case name" having registration of a case name used in mail transmission, a "body context" having registration of contents of a body text used in mail transmission, a "storage" (do/do not, open/not open) for designating if a document is stored and open, a "document name" having registration of a document name used in storing a document, a "user name" having registration of a user name required to obtain authorization when a storage document is referred to, a "password" having registration of a password required to obtain authorization when a storage document is referred to, a "fracturing storage" (e.g. do (including a number of pages), do not) for designating if divisional storage is executed when the document is stored, a "thumbnail designation" (do (including a number of pages and regional designation), do not) for designating if a page number and an image region are designated, a "destination" having registration of a destination used in transmitting a facsimile, a "document name" having registration of a document name used in transmitting a facsimile, a "transmission option designation" (do, do not) for designating if transmission option is designated or not, a "reading condition" for designating a reading condition when an image is formed, information of an "image processing condition" for designating an image processing condition when an image is formed, and a "transmission/storage form designation" (do (selected from form data), do not) for designating if a form used at times of transmission and storage is designated or not.

When the "transmission option designation" is positively set, a "file type" (no change, an image file, an image PDF, an image PDF+OCR) for designating if a file type is changed, and "link transmission" (do, do not) for representing if link transmission is applied are included.

When the "link transmission" is positively set, a "link type" (a document storage link, a file transmission link (selected from file transmission link addresses)), a "thumbnail transmission" (do, do not) for representing if a thumbnail image is transmitted, and a "file integration" (do, do not) for representing if transmission files are integrated in a package and are additionally included. When the "file integration" is positively set, all transmission files are compressed by applying a prescribed decoding compression technique when mail or facsimile transmission is performed.

When the "transmission/storage form designation" is positively set, a "file name" (do, do not) representing if a file name receives form-combination, a "file date" (do, do not) representing if a file date receives form-combination, and a "personal name" (do, do not) representing if a personal name receives form-combination are included.

As shown in FIG. 13, the print condition one touch button includes a "name" for identifying a printing condition on a one-touch button, a "character size" for designating a character size to be applied when a name is displayed on a one-touch button, an "icon" for designating an icon for display a thumbnail image of a printing condition on the one-touch button, a "display/absence" for designating if a printing condition one touch button is displayed (including designation of a displaying manner when displayed), a "printing type" (layout printing, repeat printing) for designating a printing type and an "original document type" (full-color, monochrome, twin color (black and magenta, black and cyan), for designating a color, an "image quality priority/speed priority" for designating one of image quality priority and speed priority when printing, a "duplex printing" (do (horizontal or vertical page alignment), do not) for designating if a duplex printing is performed, a "sort/stack" for designating a sorting process after printing, a "punch" (do (left side two, upside two, right side two), do not) for designating a punch processing after printing, a "staple" (left upper side, right upper side, center, left side two, upper side two, right side two, absence), for designating a stapling processing after printing, a "sheet selection" (automatic sheet selection, selection from selectable sheet sizes) for designating a printing sheet, an "image processing condition" for designating an image processing condition when printing, and a "print form designation" (do (selected from form data), do not) for designating a printing form.

Further when the "print form designation" is positively set, a "file name" (do, do not) for representing if a file name receives form-combination, a "file date" (do, do not) for representing if a file date receives form-combination, and a "personal name" (do, do not) for representing if a personal name receives form combination are included.

When the "print type" is the "repeat printing" substantially the same image is used as an insertion image on a form. A "Do" cannot be selected for the "punch" when a finisher is not attached. A number of holes depends upon a type of the finisher. The "staple" is only available when a number of sheets is more than two, and cannot be selected when a finisher is not attached. A central binding depends upon a type of the finisher. Further, a sheet size selected on a printing detail-setting screen is registered through a one-touch button as a "sheet selection".

Figures 14A, 14B, 14C:
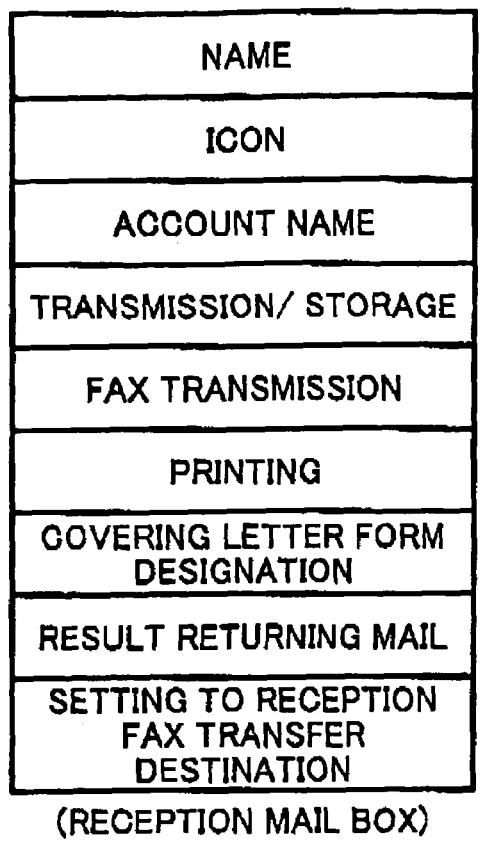
FIGS. 14A to 14E illustrate an exemplary reception mailbox, exemplary initial values of a name, an account name, an exemplary sharing media address, and an exemplary file transmission link address, respectively.

As shown in FIG. 14A, a reception mail box includes a "name" for identifying a reception mail box, an "icon" for designating an icon for displaying a thumbnail image of the reception mailbox, an "account name" to which an account name using the reception mailbox is registered, a "transmission/storage" to which a "do" is only set for a later mentioned storage mail box, a "facsimile (fax) transmission" to which a "do" is only set for a later mentioned facsimile mailbox, a "printing" to which a "do" is only set for a later mentioned print mail box, a "covering letter form designation" (do, do not) to which "do not" is fixedly set for a later mentioned error mail box, plural "do"s are set for the later mentioned facsimile and print mail boxes, and a selection value is set to the other mail boxes, a "result returning mail" (do, do not) to which "do not" is set for the error mail box, and selection values are set for the other mail boxes, a "setting to reception facsimile (fax) transfer destination" to which "do" is only set for a storage mailbox, and plural "do not"s are set for the other mail boxes.

As shown in FIG. 14B, the "name" is a system default. Specifically, an error mail (an error mail box; for receiving an electronic error mail such as a distribution error report, etc.), a facsimile (fax) mail (a facsimile mail box; wherein a reception mail is regarded as a facsimile transfer use mail), a print mail (a printing mail box; wherein a reception mail is regarded as a printing use mail, and accordingly contents of which and a file attached thereto are printed out), and a storage mail (a storage mail box; wherein a reception mail is regarded as a storage use mail, and accordingly contents of which and a file attached thereto are stored) are set to the respective reception mail boxes "01" to "04". System default values for the remaining reception mail boxes "05" to "12" are "empty", and a user can set optional value.

As shown in FIG. 14C, the "account name" is a system default. Specifically, respective "sender", "fax", "print", and "store" are set in those boxes so that functions of the respective reception mail boxes "01" to "04" can be clearly noted. The remaining reception mail boxes "05" to "12" have system default values representing "empty" waiting for optional setting from a user.

Further, the "account name" needs a unique character string for each of reception mailboxes per personal setting. A mail address is a "display name", <<account name=parameter. user ID@ identification name. host name. domain name>>". The parameter includes a telephone number, in a case of facsimile transmission, a number of sheets (one when omitted), in a case of printing, and is not used in a case of file transmission.

A practically usable SMTP/POP reception mail address is indicated on a setting/storage screen button.

As for a "transmission/storage", a transmission/storage form can be designated by operating the transmission/storage condition one touch button, and is stored in a "general document" storage. Further, a "reception mail" is always stored on conditions that it is not disclosure, a document name is used as a case name, and a password is excluded.

As for a "facsimile (fax) transmission", a facsimile destination extracted from parameter of "To mail destination" is automatically added to a mail destination of a designated "transmission/storage condition preset".

As for a "printing", a printing form can be designated using a print condition one-touch button.

As for a "covering letter form designation", it is selected from a mail header or a mail body context insertable form. This form is only used for the mail header/body context in the positive situation. It complies with a text file format as a fundamental setting in the negative situation. A text file attached to a mail always complies with the fundamental setting.

A "result returning mail" is capable of setting if an output result is returned by mail. Since an output image is inspectable on a Web, any files are not attached without exception.

A "setting to reception facsimile (fax) transfer destination" can positively set only for one reception mailbox among twelve. Then, an image is transferred to a user set as a transfer recipient at a time of facsimile reception.

Figure 14D:
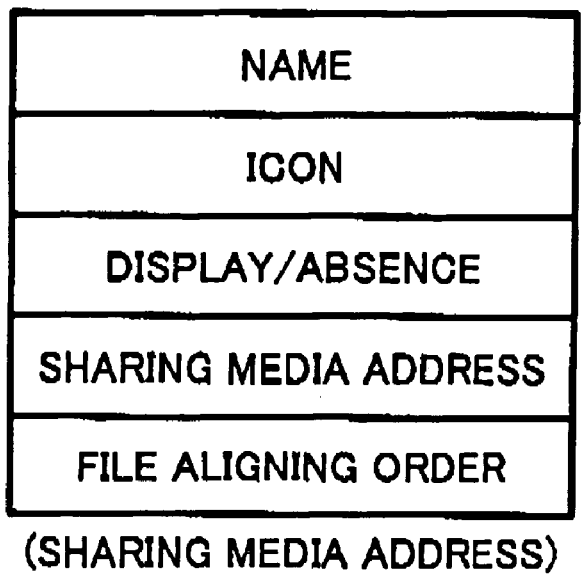

As shown in FIG. 14D, a sharing media address includes a "name" for identifying a sharing media address, an "icon" for designating an icon for display of a thumbnail image of a sharing media address, a "display/absence" for designating if a sharing media address is displayed (when displayed, designation of a displaying manner is included), a "sharing media address" in which an address value selected from a "file destination" as registration information is preserved, and a "file aligning order" (no selection, a name downward or upward order, a date upward or downward order, a size downward or upward order).

When the "file aligning order" is the "no selection", they are displayed in correspondence with a listing order on the media side. For example, it is listed in a photographing order, or a file name downward order in a case of a digital camera. It is listed in a downward order of an updated date in compliance with a rule in a case of an external server. In this situation, a new file is displayed at a highest position.

Figure 14E:
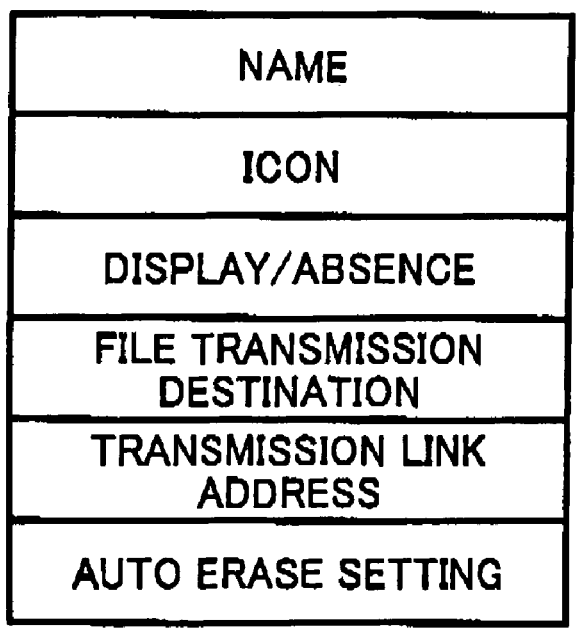

As shown in FIG. 14E, the "file transmission link address" includes a "name" for identifying a file transmission link address, an "icon" for designating an icon for display a thumbnail image of the file transmission link address, a "display/absence" for designating if a file transmission link address is displayed (when displayed, designation of a displaying manner is included), a "file transmission destination" for designating a file transmission destination address (e.g. an address at a time of uploading), a "transmission link address" for designating a link address designated when a file is transmitted and obtained by another user, and an "automatic (auto) erase setting" (do (with holding term of from one to a hundred and eighty days), do not).

As shown in FIG. 15A, a "personal system setting information" includes seven categories of fundamental, display, reading, communications, storage, printing, and optical character reading (OCR) settings, etc.

As shown in FIG. 15B, a "fundamental setting" includes an "automatic (auto) termination of personal menu" (do (from 0 to 999 seconds), do not) for setting a mode in which a personal menu is automatically terminated when an operational condition discontinues, a "setting automatic (auto) clear time" setting (do (from 10 to 999 seconds), do not) for setting a mode in which a guest menu is automatically cleared when an operational condition discontinues, a "coming back to main screen after end of operation" (do, do not) for designating if a screen is returned to a main screen when a user completes an operation, a "setting key input/screen touch sound" (do, do not) for designating if a key input sound or a screen touch sound is generated, an "auto inputting of case name of mail" (do (selected from registered case names), do not) for designating if a mail case name is automatically input when a mail is transmitted, an "auto inputting of mail body context" (do (selected from registered case names), do not) for designating if a mail body context is automatically input when a mail is transmitted, a "text file type", a "setting compression at time of conversion into TIFF image" (no compression, MH, MR, MMR manners) for designating a compression manner when image data is converted into a TIFF format image, a "setting compression at time of conversion into JPEG image" (one of nine levels) for designating image quality setting when image data is converted into a JPEG format image, and a "maximum number of colors at time of conversion into PNG image" (2,4,8,16,32,64,128, and 256 colors) for designating the maximum number of colors when image data is converted into a PNG format image.

Figure 16:
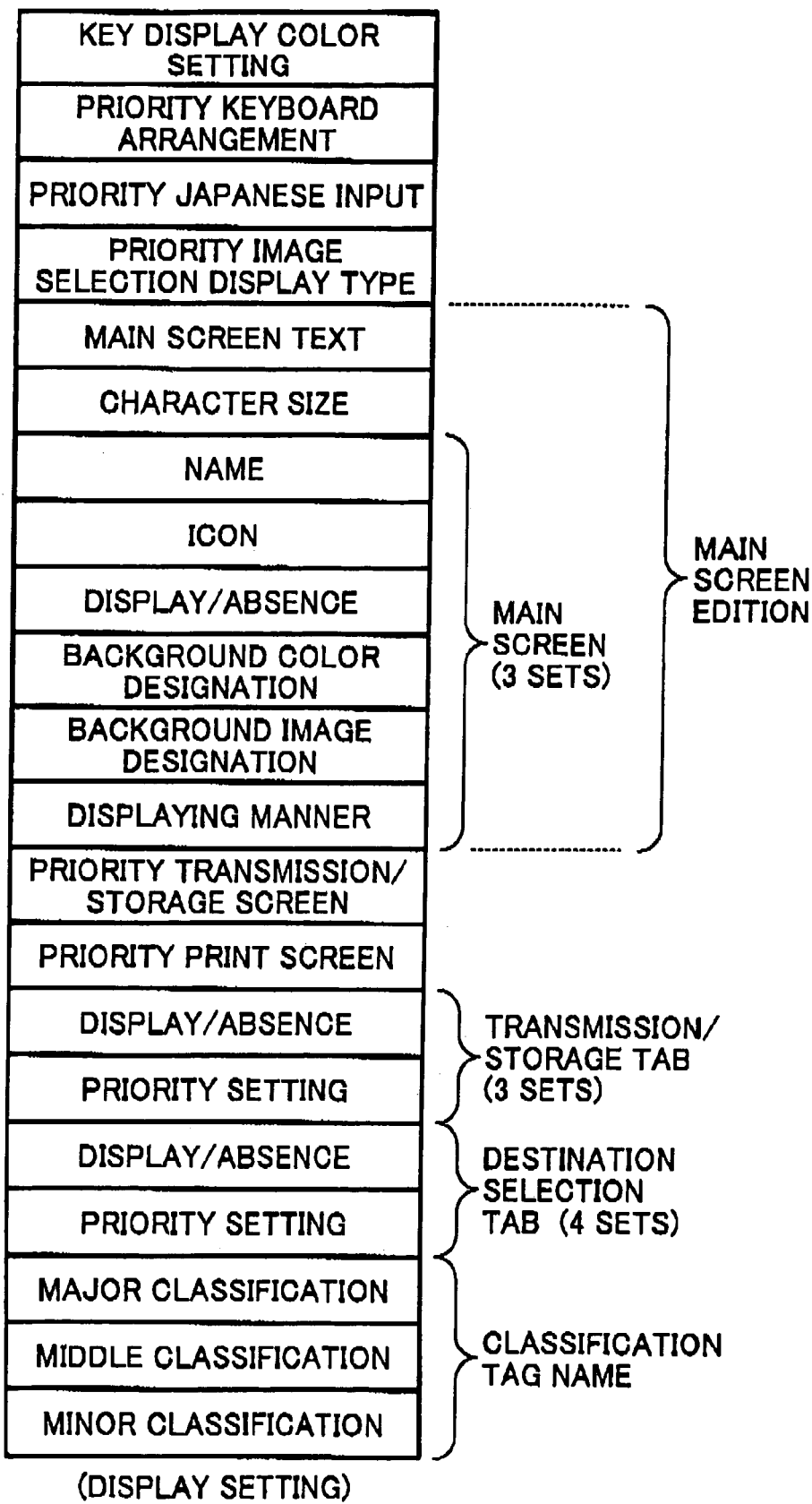
FIG. 16 illustrates an exemplary display setting.

As shown in FIG. 16, a display setting includes a "key display color setting" for setting a display color of a keyboard displayed on a screen, a "priority keyboard arrangement" (a QWERTY type, an ABC type) for designating a priority value of a key arrangement of the keyboard, and a "priority Japanese input" (roman letter, kana) for designating a priority value of a Japanese input manner. Also included are a "priority image selection display type" (a thumbnail, a list) for designating a priority level of a display manner when an image is selected, a "main screen text" for designating a type of a text displayed on the main screen, and a "character size" for designating a size of a text displayed on the main screen.

Further included are a "character size", a "name", an "icon", a "display/absence" (do (by changing a listing order), do not), a "background color designation" (do (by selecting from 216 Web safe colors), do not), a "background image designation" (do (by selecting an image), do not), and a "displaying manner" juxtaposing display, enlarged display) for each of the three main screens of a "sheet document", a "media document", and a "storage document". Further included are a "priority transmission/storage screen" (a one touch screen, and a detail setting screen) for designating a screen displayed on a transmission/storage screen by priority and a "priority print screen" (a one touch screen, a detail setting screen) to be displayed by priority on a printing screen. Still further included are a "display/absence" (do (by changing a listing order), do not), and a "priority setting" for three transmission/storage tab of a "mail transmission", a "facsimile transmission", and a "file transmission". Still further included are a "display/absence" (do (by changing a listing order), do not), a "priority setting" for each of four destination selection tabs of a "mail destination", a "facsimile destination", a "group destination", and a "disclosure address book". Further, "major, middle, and minor classifications" of CALS-XML classification tag names are included.

Figure 17A:
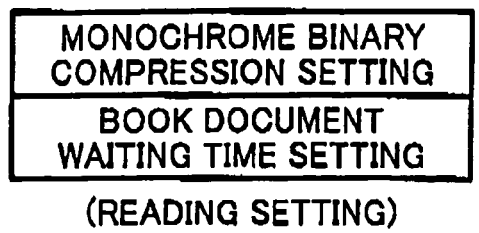
FIGS. 17A to 17C illustrate exemplary reading, communicating, and storage settings, respectively.

As shown in FIG. 17A, a reading setting includes a "monochrome binary compression setting" (non compression, MR, NH, MMR manners) for indicating a white and black binary compression processing, and a "book document waiting time setting" (do (from 60 to 999 seconds), do not) indicative of setting of a waiting time period of a book type original document.

Figure 17B:
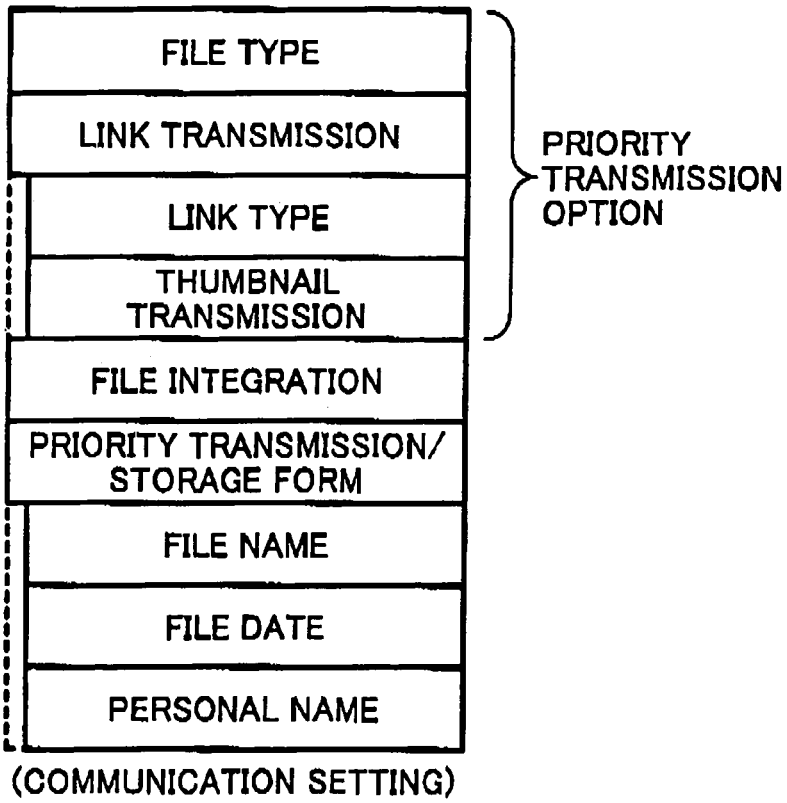

As shown in FIG. 17B, communications setting includes a "file type" (no-change, an image file, a PDF, image PDF+OCR), a "link transmission" (do (as described below), do not), which is valid only to a mail destination, a "file integration" (do, do not) and a "priority transmission/storage form" (existing form)" each for a priority transmission option.

When the "link transmission" is given a "do", "link type" (a document storage link, a file transmission link (selected from file transmission link addresses)) and a "thumbnail transmission", which is always transmitted with an image PDF, are included. A wired transmission option is validated when a transmission format is not designated by the transmission/storage condition preset.

The "priority transmission/storage form" is used when a transmission/storage condition one-touch button does not designate a transmission/storage form, and includes a "file name" (do, do not), a "file date" (do, do not), and a "personal name" (do, do not).

Figure 17C:
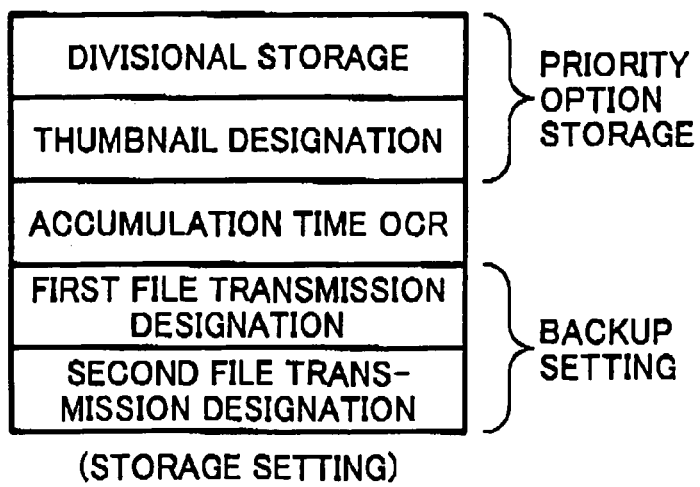

As shown in FIG. 17C, a storage setting includes a "divisional storage" (do (a number of pages per segmentalization), do not) as a priority option, a "thumbnail designation" (do (designation of a number of pages and a region), do not), an "accumulation time OCR" (do, do not), a "first file transmission destination" (a primary transmission destination) serving as backup setting that sets a location where a copy is made simultaneously at a time of storage, and a "second file transmission destination" (a secondary primary transmission destination).

When the "accumulation time OCR" is positively set, only a general document receives OCR at a time of storage.

Figure 18A:
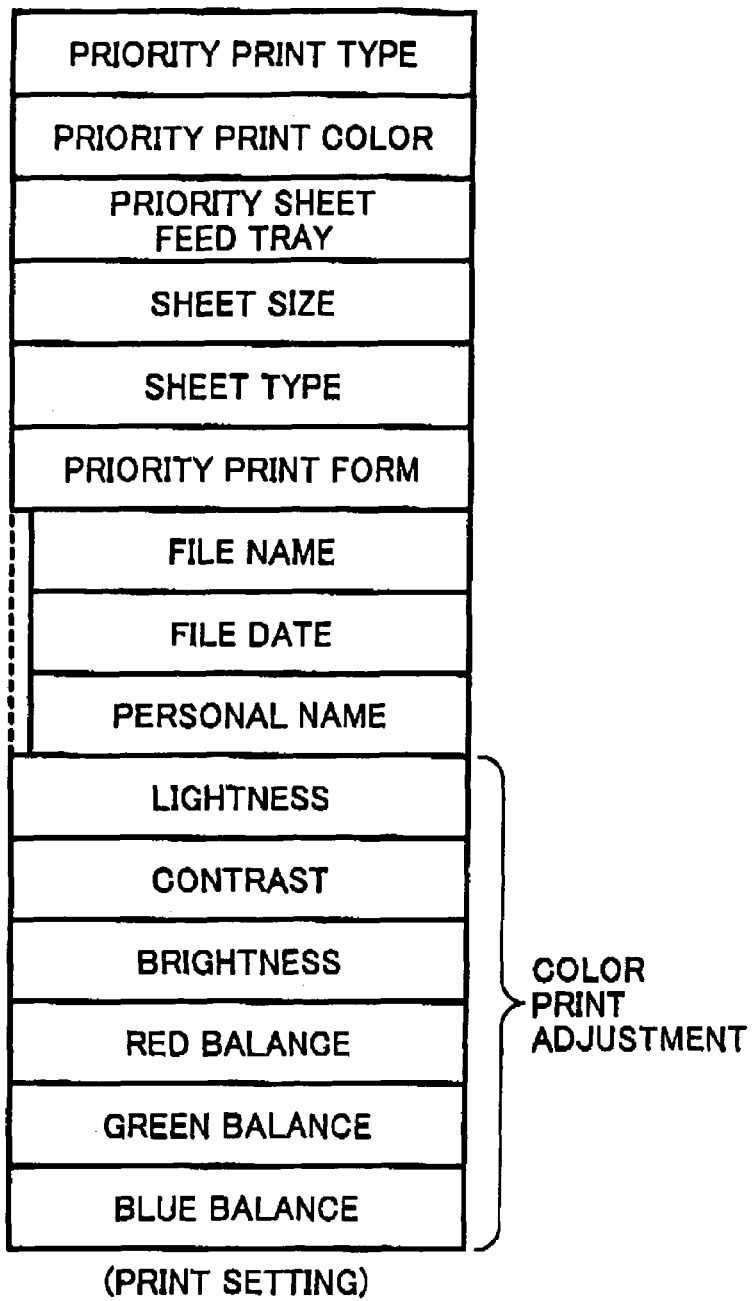
FIGS. 18A and 18B illustrate exemplary print and OCR settings, respectively.

As shown in FIG. 18A, print setting includes a "priority print type" (layout print, repeat print), a "priority print color" (full-color, mono-color, black and cyan, black and magenta), and a "priority sheet feed tray" (automatic sheet selection, trays 1, 2, 3, massive amount of sheet feeding, manual sheet feeding (sheet size, sheet type)). Also included are a "sheet size" (when a "priority sheet feeding tray is a "manual sheet feeding"), a "sheet type" (when a "priority sheet feeding tray" is a "manual sheet feeding"), and a "priority print form" (prescribed form). Further included are a "lightness" (from –0% to +50%) as color printing adjustment, a "contrast" (from –50% to +50%), and a "brightness" (from –0% to +50%). Still further included are a "red balance" (from –0% to +50%), a "green balance" (from –50% to +50%), and a "blue balance" (from –0% to +50%).

When a form data is selected by the "priority print form", a "file name" (do, do not), a "file date" (do, do not), and a "personal name" (do, do not) are included.

Figure 18B:
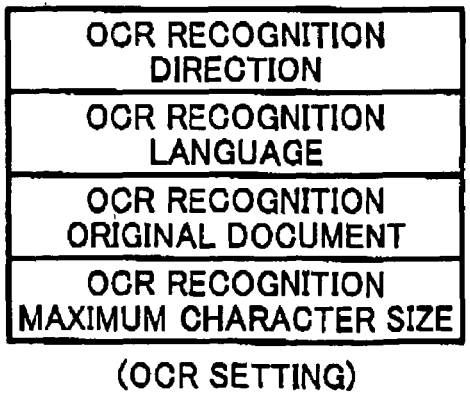

As shown in FIG. 18B, an OCR setting includes an "OCR recognition direction" (automatic, horizontal writing, vertical writing, horizontal/vertical writing, one paragraph horizontal writing, one paragraph vertical writing), an "OCR recognition language" (auto, Japanese, English), an "OCR recognition document" (auto, a document, a chart), and an "OCR recognition maximum character size" (from 6 pt (point; a unit of character size) to 64 pt).

Figure 19A:
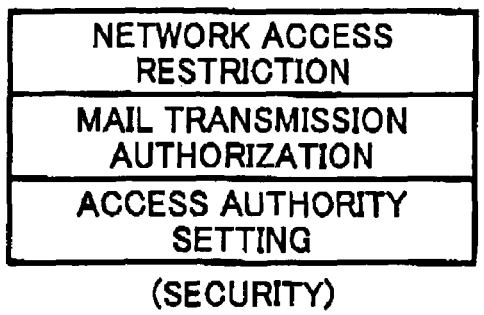
FIGS. 19A to 19D illustrate exemplary security, exemplary network accessing restriction, exemplary mail transmission authorization, and exemplary access authority restriction, respectively.

As shown in FIG. 19A, a security includes a "network access restriction", a "mail transmission authorization", and an "access authority setting".

Figure 19B:
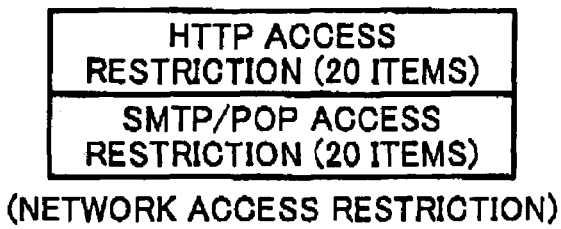

As shown in FIG. 19B, the network access restriction includes twenty "HTTP access restrictions" (do (HTTP access restriction setting; IP address), do not), and twenty "SMTP/POP access restrictions" (do (SMTP/POP access restriction setting), do not).

When the "do not" is assigned to the "HTTP access restriction" and the "SMTP/POP access restriction", administrator setting contents are applied to those.

Figure 19C:
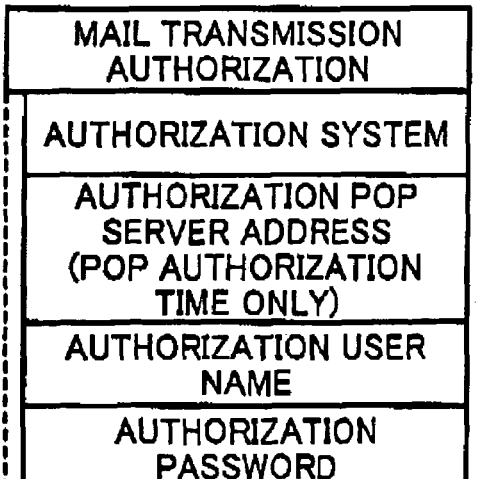

As shown in FIG. 19C, the mail transmission authorization includes a "mail transmission authorization" (do, do not) for designating if authorization information is set per person, an "authorization system" (SMTP authorization, POP authorization), an "authorization POP server address" (only in a case of POP authorization), an "authorization user name" (a user name in a case of SMTP/POP authorization), and an "authorization password" (at a time of password SMTP/POP authorization) when the "do" is set to the "mail transmission authorization".

Figure 19D:
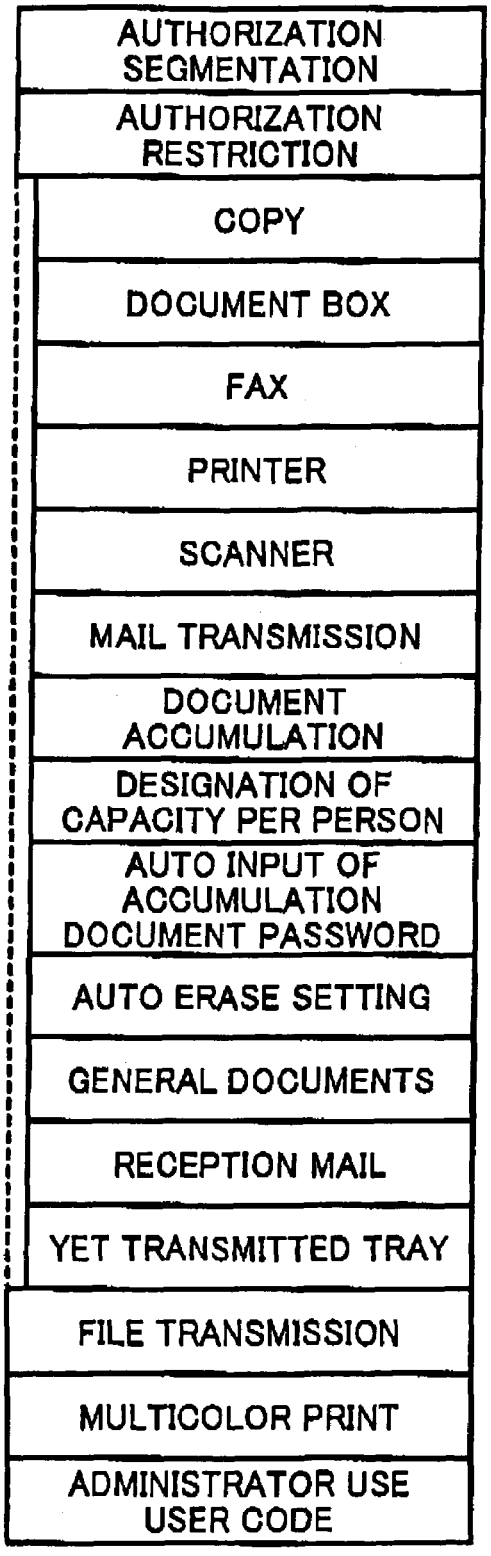

As shown in FIG. 19D, the access authority setting includes an "authorization segmentation" (an administrator, a general user), an "authorization restriction" (do, do not), a "file transmission" (allowance, rejection), a "multi-color print" (allowance, rejection), and an "administrator use user code".

When the "do" is set to the "authorization restriction", a "copy" (allowance, rejection), a "document box" (allowance, rejection), a "facsimile (fax)" (allowance, rejection), a "printer" (allowance, rejection), a "scanner" (allowance, rejection), a "mail transmission", a "document accumulation", and an "automatic (auto) erase setting" (allowance, rejection) are included.

When the "allowance" is set to the "document accumulation", a "designation of capacity per person" (do (from 0.1 GB to 99.9 GB), do not), and an "automatic input of accumulation document password" (do, do not) are included.

When the "allowance" is set to the "automatic (auto) erase setting", a "general document" (do (storing 1 to 180 days), do not)), a "reception mail" (do (storing 1 to 180 days), do not)), and a "yet transmitted tray" (do (storing 1 to 180 days), do not)) are included.

As shown in FIG. 20A, system setting information includes five categories of network, mail, facsimile, and file communications settings, as well as a system administration.

As shown in FIGS. 20B and 20C, the network setting includes a "host name", a "domain name", an "IP address", a "subnet mask", a "gateway address", a "1st DNS sever address" (an IP address of a primary DNS server), a "2nd DNS sever address" (an IP address of a secondary DNS server), a "proxy sever setting" (do, do not), a "SSL (Secure Sockets Layer) encryption" (do, do not), a "port number setting" (do, do not), a "printer IP address", a "LAN (Ethernet) speed" (automatic setting, 10 Mbps with fixed full duplex, 100 Mbps with fixed full duplex, 10 Mbps with fixed half duplex, 100 Mbps with fixed half duplex), and a "physical address" (MAC address).

When the "do" is set to the "proxy sever setting", a "proxy server address", a "proxy server port no.", a "virgin proxy address ", a "user name", and a "password" are included.

When the "do" is set to the "SSL encryption", an "ISO country code", a "prefecture name", a "city name", a "company name/organization name", a "department name/organization name/belonging section name", a "server name" (initially, a host name), an "administrator mail address", and a "valid term" are included.

When the "do" is set to the "port number setting", a "SMTP transmission" (25 as an initial value), a "SMTP reception" (25 as an initial value; 0 to 65535), a "POP" (110 as an initial value; 0 to 65535), a "FTP" (21 as an initial value; 0 to 65535), a "HTTP" (80 as an initial value; 0 to 65535), a "HTTPS" (443 as an initial value; 0 to 65535), and a "LDAP" (389 as an initial value; 0 to 65535) are included.

When a "zero" is set as a port number of the "SMTP transmission", the SMTP transmission function cannot be used.

As shown in FIGS. 21A and 21B, a mail setting includes a "SMTP server IP address", a "mail reception protocol" (SMTP, POP3, APOP), a "POP mail address", a "POP server address", a "POP account name", a "POP password", a "POP mail reception interval", a "POP mail rule transfer destination" (a reception mail address of guest setting information), a "using disclosed address book (do, do not), a "mail transmission authorization" (do, do not), a "transmission size restriction" (do, do not), a "transmission interval" (0 to 99 seconds), a "retransmission interval" (0 to 99 seconds), and a "number of retransmissions" (0 to 99 times).

When the "do" is set to the "using disclosed address book", a "first LDAP server address", an "identification name", a "second LDAP server address", an "identification name", and an "automatic updating of disclosed address book" (do (a unit of 10 minutes), do not) are included.

When the "do" is set to the "mail transmission authorization", an "authorization system" (SMTP authorization, POP auth), an "authorization POP server address", an "authorization user name", and an "authorization password" are included.

When the "do" is set to the "transmission size restriction", a "maximum size" (1 to 20 MB), and a "mail division" (do (a number of segmentalization; 2 to 99), do not) are included.

Figure 22A:
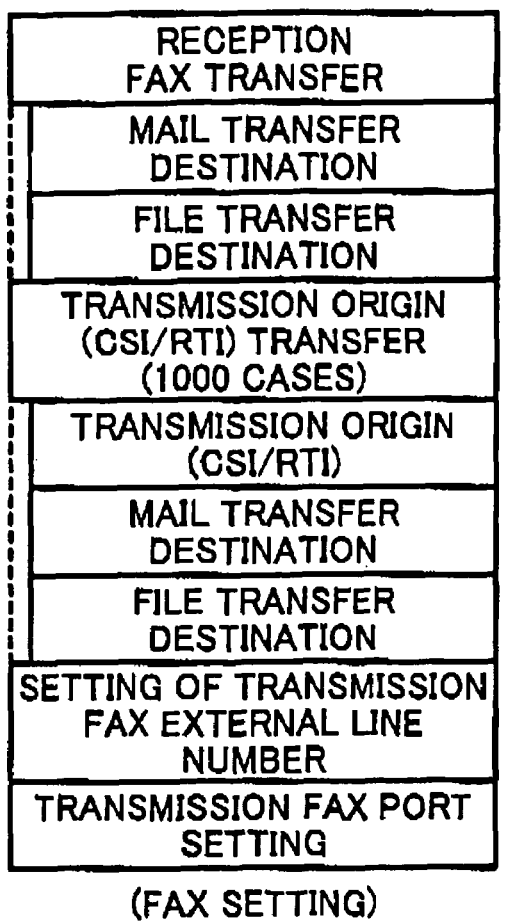
FIGS. 22A and 22B illustrate exemplary facsimile and facsimile communications settings, respectively.

Facsimile setting is used to set a function of transfer distribution (a mail or a file transfer destination) at a time of reception. As shown in FIG. 22A, the facsimile setting includes a "reception facsimile (fax) transfer" (do, do not), a thousand cases of "transmission origin (CSI/RTI) transfer" (do, do not), a "setting of transmission facsimile (fax) external line transmission number", and a "transmission facsimile (fax) port setting".

One "transmission origin" (CSI/RTI) transfer includes a "mail transfer destination" (selected from "mail/group destinations", "registration users" as guest setting information), and a "file transfer destination" (selected from the "file destinations" on the guest setting).

A hundred items can be registered at most in the "mail transfer destination". Four items can be registered at most in the "file transfer destination".

Figure 22B:
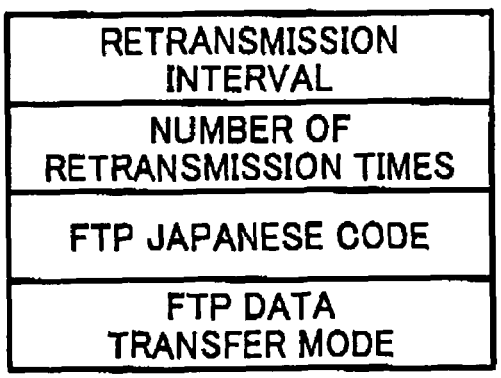

As shown in FIG. 22B, a file communications setting includes a "retransmission interval" (60 to 999 seconds), a "number of retransmission times" (0 to 99 times), a "FTP Japanese code" (shift JIS, EUC), and a "FTP data transfer mode" (a PORT mode, a PASV mode).

Figure 23A:
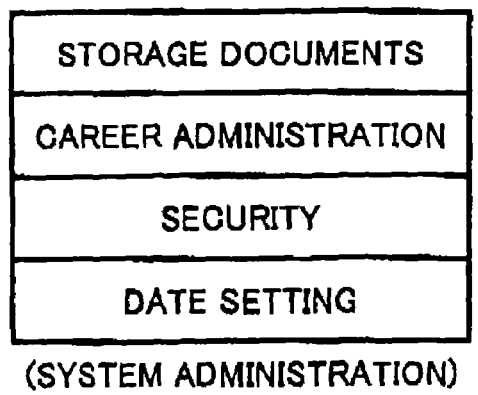
FIGS. 23A to 23E illustrate exemplary system administration, exemplary storage documents, exemplary career administration, exemplary security, and exemplary date setting, respectively.

As shown in FIG. 23A, a system administration includes four categories of a storage document, a career administration, a security, and a date setting.

Figure 23B:
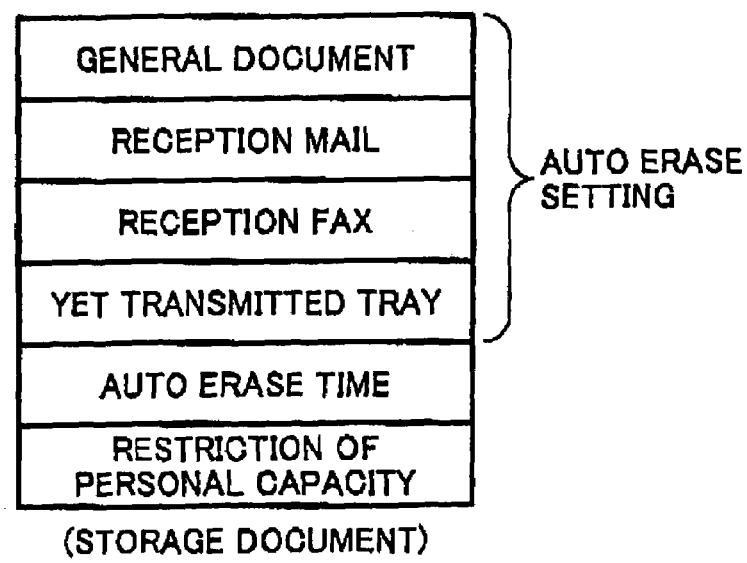

As shown in FIG. 23B, the storage document includes a "general document" (do (1 to 180 days holding), do not) for setting automatic erase setting, a "reception mail" (do (1 to 180 days holding), do not), a "reception facsimile" (do (1 to 180 days holding), do not, a "yet transmitted tray" (do (1 to 180 days holding), do not), an "automatic (auto) erase time" (erasing time (0:00 to 23:50), and a "restriction of personal capacity" (do (0.1 GB to 99.9 GB), do not.

Figure 23C:
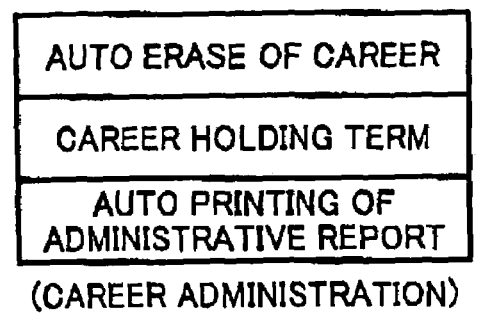

As shown in FIG. 23C, the career administration includes an "automatic (auto) erase of career" (do (erasing time 0.00 to 23:50), do not, a "career holding term" (do (1 to 180 days), do not, and an "automatic (auto) printing of administrative report" (do (printing time 0.00 to 23:50), do not.

Figure 23D:
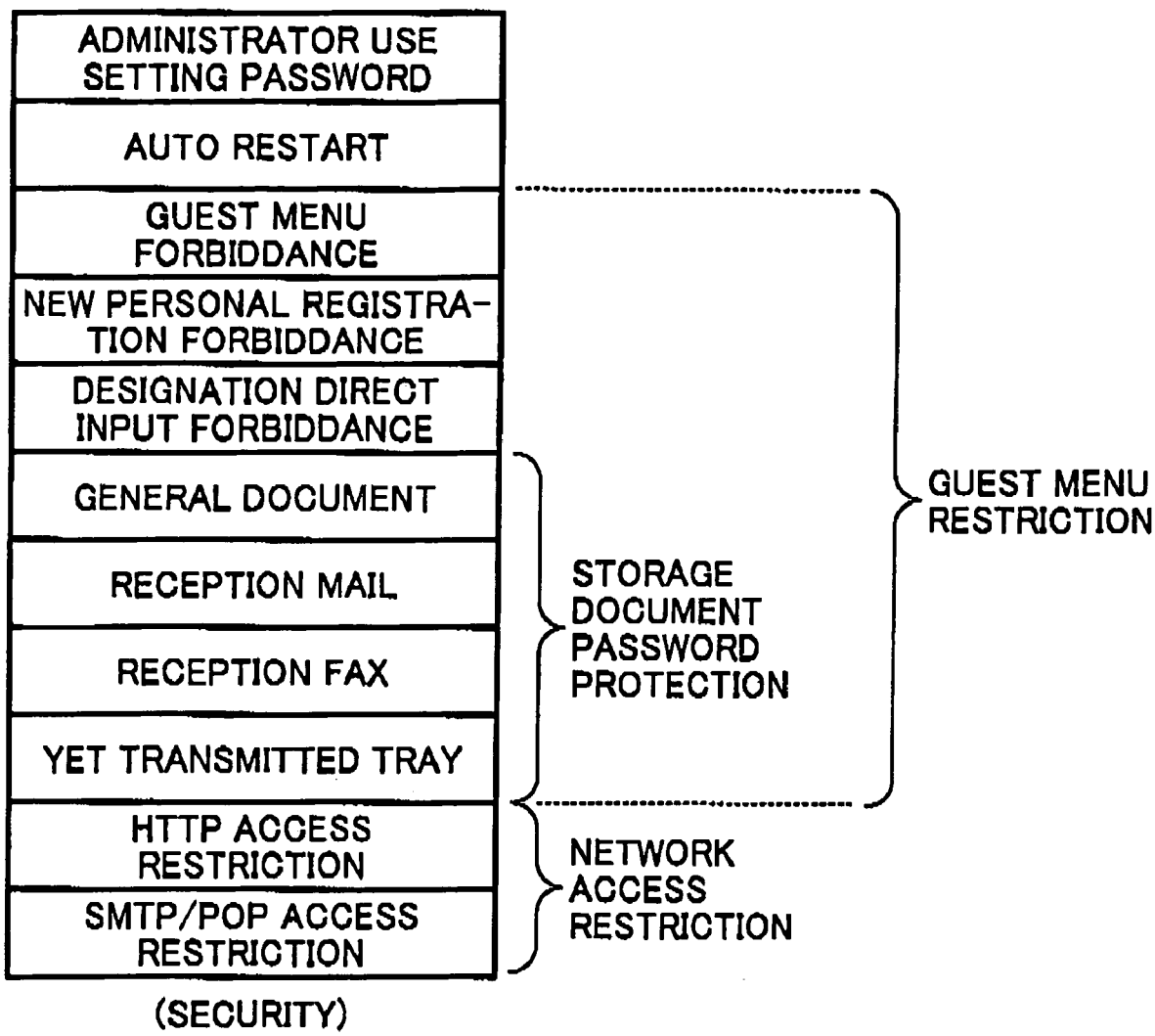

As shown in FIG. 23D, the security includes an "administrator use setting password", an "automatic (auto) restart" (do (with restarting time 0.00 to 23:50), do not), a "guest menu forbiddance" (do, do not), a "new personal registration forbiddance" (do, do not) and, a "designation direct input forbiddance" (do, do not) each for the "guest menu restriction". Also included are a "general document" (do, do not), a "reception mail" (do, do not), a "reception facsimile (fax)" (do, do not) and a "yet transmitted tray" (do, do not) each for password protection of a storage document of the guest. Further included are a "HTTP access restriction" (do (HTTP access restriction setting), do not), and a "SMTP/POP access restriction" (do (SMTP/POP access restriction setting), do not) each for the "network access restriction".

To protect a storage document before logging on the multifunctional product 1, an administrator use setting password is used when a guest enters into a screen thereof, and a user name of a Web browser requests a user ID. A user name of the Web browser is an identification name set by the guest.

Figure 23E:
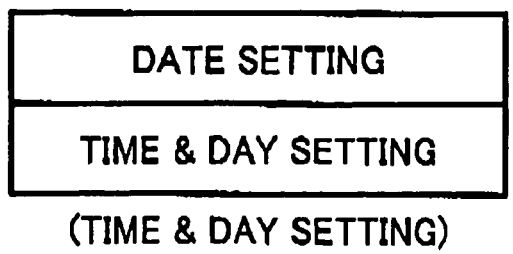

As shown in FIG. 23E, a date setting includes a "date setting" (e.g. current date; 2003 to 2099, Jan. to Dec., 1 st to 31 st), and a "time & day setting" (e.g. a current time; 0 to 23 O'clock, 0 to 59 minutes, 0 to 59 seconds).

When a URL is transmitted by electronic mail as link information to obtain a prescribed file to a destination of a multifunctional product 100 from multifunctional product 1 while requesting authorization information, the multifunctional product 100 cannot logon a FTP server (i.e., a file server), resulting in missing of a file, because an operator does not always attend to the multifunctional product 100 to respond by inputting the authorization information.

To prevent such missing of a file, a password and a user ID are generally included in the link information to obtain authorization of access and identify the file when logging on the FTP server. However, since such an electronic mail is transmitted without being encrypted, it is not preferable in view of security.

Then, to deal with such a situation, a confidential link is employed in the preferred embodiment.

Figure 24A:
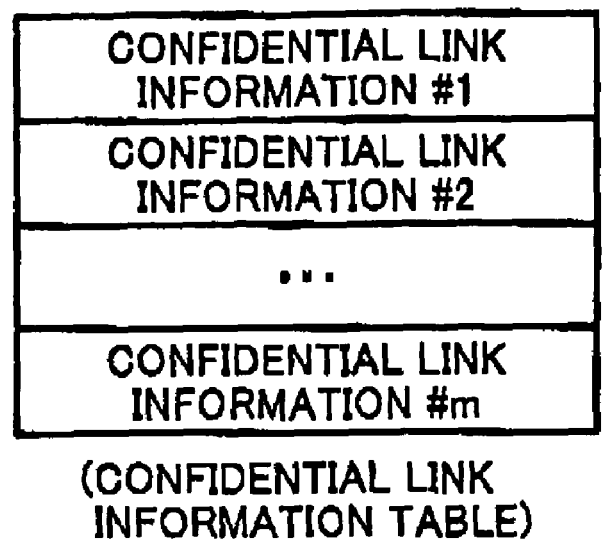
FIGS. 24A and 24B illustrate an exemplary confidential link information table and exemplary confidential link information, respectively.
Figure 24B:
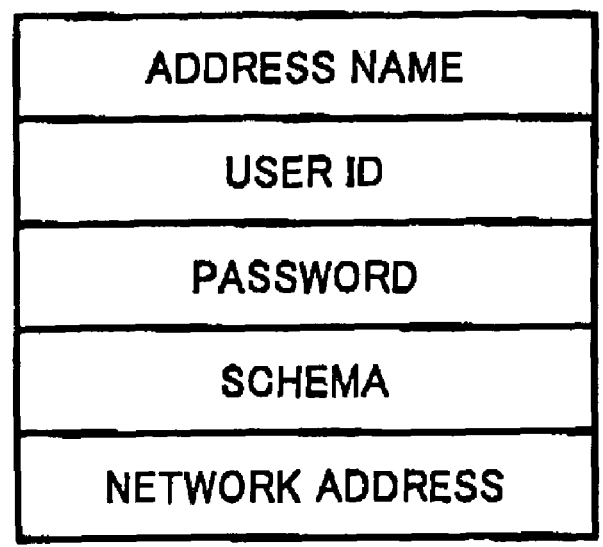

Specifically, the multifunctional product 1 includes a confidential link information table that stores a plurality of confidential link information as shown in FIG. 24A. Each of the confidential link information includes an "address name", a "user ID", a "password", a "schema", and a "network address" as shown in FIG. 24B.

A plurality of common confidential link information (e.g. a user ID and a password) are included and used between multifunctional products 1 and 100, which frequently communicate a confidential link with each other. A transmission side puts a "network address/file name", for example, in body text information of an electronic mail to designate confidential link information.

An electronic mail reception side then extracts the confidential link information from the confidential link information table based on the "network address" included in a reception electronic mail.

Then, the reception side accesses a FTP server (e.g. a file server) to obtain an objective file using a corresponding schema and network address registered in the confidential link information table. When the FTP server requests authorization information, the reception side responds by providing a corresponding user ID and password.

After logging in the FTP sever, the reception side retrieves an objective "file name" and extracts and obtains the objective file from the FTP server.

Further, when an operator of the multifunctional product 1 intends to transmit a document file stored in its own storage device such as a HDD to another user such as a multifunctional product 100 using the confidential ink, he or she notifies the confidential link information (URL/URI) for obtaining a storage document file by an electronic mail without the storage file to the other user as document storage link transmission.

The destination (i.e., multifunctional product 100) having received such an electronic mail then accesses the multifunctional product 1 by processing the confidential link information with appropriate application (for example, a ftp client, a Web browser, etc.,), and obtains the storage file. Since the multifunctional product 1 ordinarily uses a FTP protocol when downloading a storage document file, a link information includes "ftp://<host>:<port>/<path>". A pass name is arranged in the <path> to represent a file name of a storage document included in a file system of the multifunctional product.

An attribute that indicates either "disclosure" or "non-disclosure" can be added to a document stored in the multifunctional product 1. Such an attribute can be added at one of when a user stores a document, and when a personal system setting or a system setting is performed.

When a document file externally requested to be obtained includes "disclosure" as an attribution, the multifunctional product 1 transmits a document file to a file request origin without condition.

In contrast, when a document file externally requested to be obtained includes "non-disclosure" as an attribution, the multifunctional product 1 transmits information that requests an input of authorization information, such as an operational screen for inputting and returning the authorization information, to the file request origin.

When appropriate authorization information, such as a user ID and a password, etc., is received from the file request origin, the multifunctional product 1 transmits the document file to the file request origin.

When the appropriate authorization information is not received from the file request origin, the multifunctional product 1 transmits messages indicative of denial of the file request to the file obtaining request origin.

Destinations receiving "document storage link transmission" are limited to those that belong to an Intranet to which the multifunctional product 1 belongs. The Intranet represents all of networks, such as a network formed by connecting and consolidating a plurality of local area network with a VPN, networks given the same domain, etc., beside a single segment of a LAN.

Now, an exemplary operation performed in the multifunctional products 1 and 100 are described with reference to FIGS. 25A to 30.

Figure 25B:
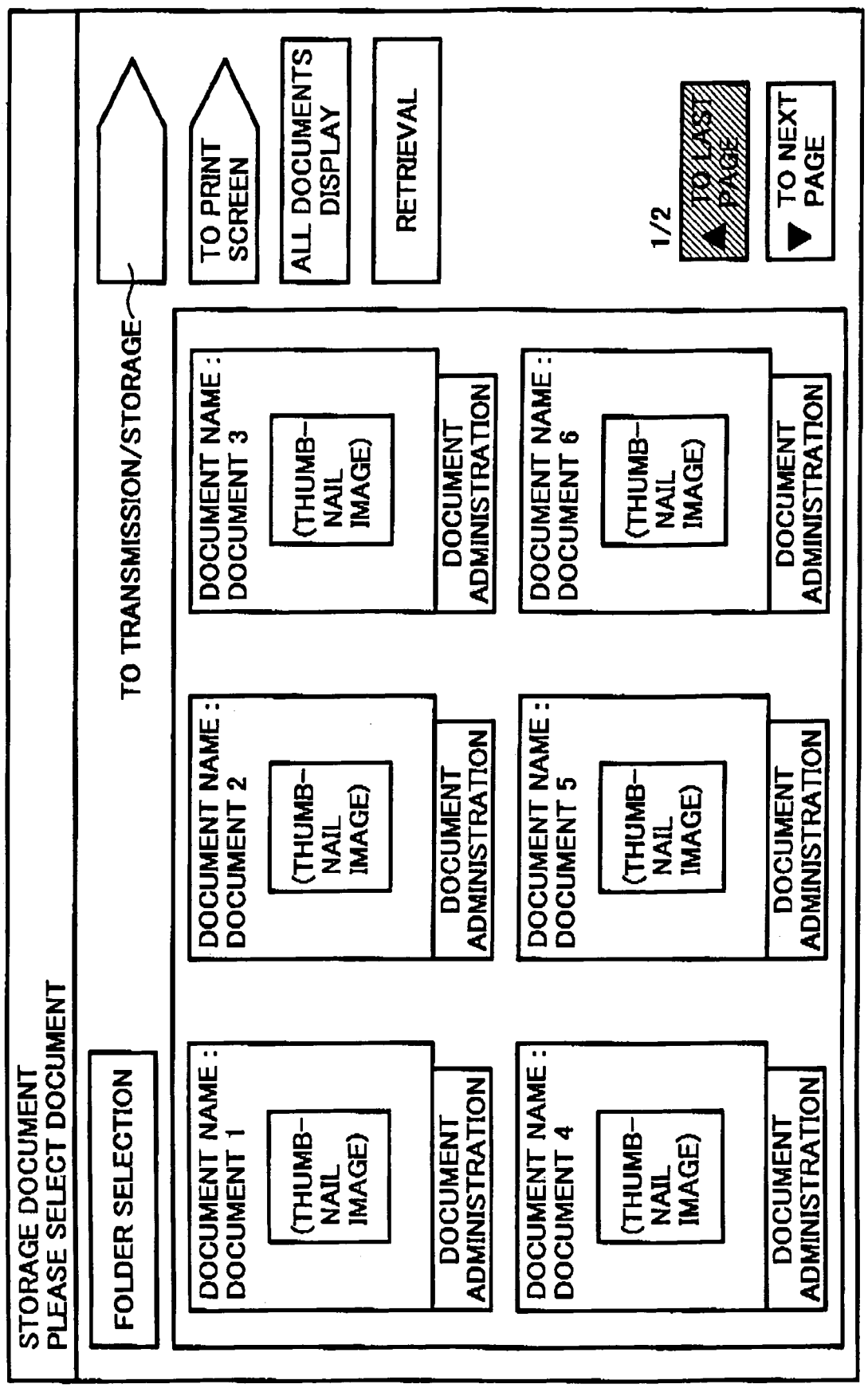

When a user logs in the multifunctional product 1 to execute such document storage link transmission, a personal menu screen is displayed as shown in FIG. 25A. When the user depresses a button (e.g. a "storage document") enabling a function of accessing a storage document, a storage document screen is displayed as shown in FIG. 25B. Contents displayed on the storage document screen accord with details set to the main screen on the display setting screen on the personal system setting information screen on the personal setting information screen.

Figure 26A:
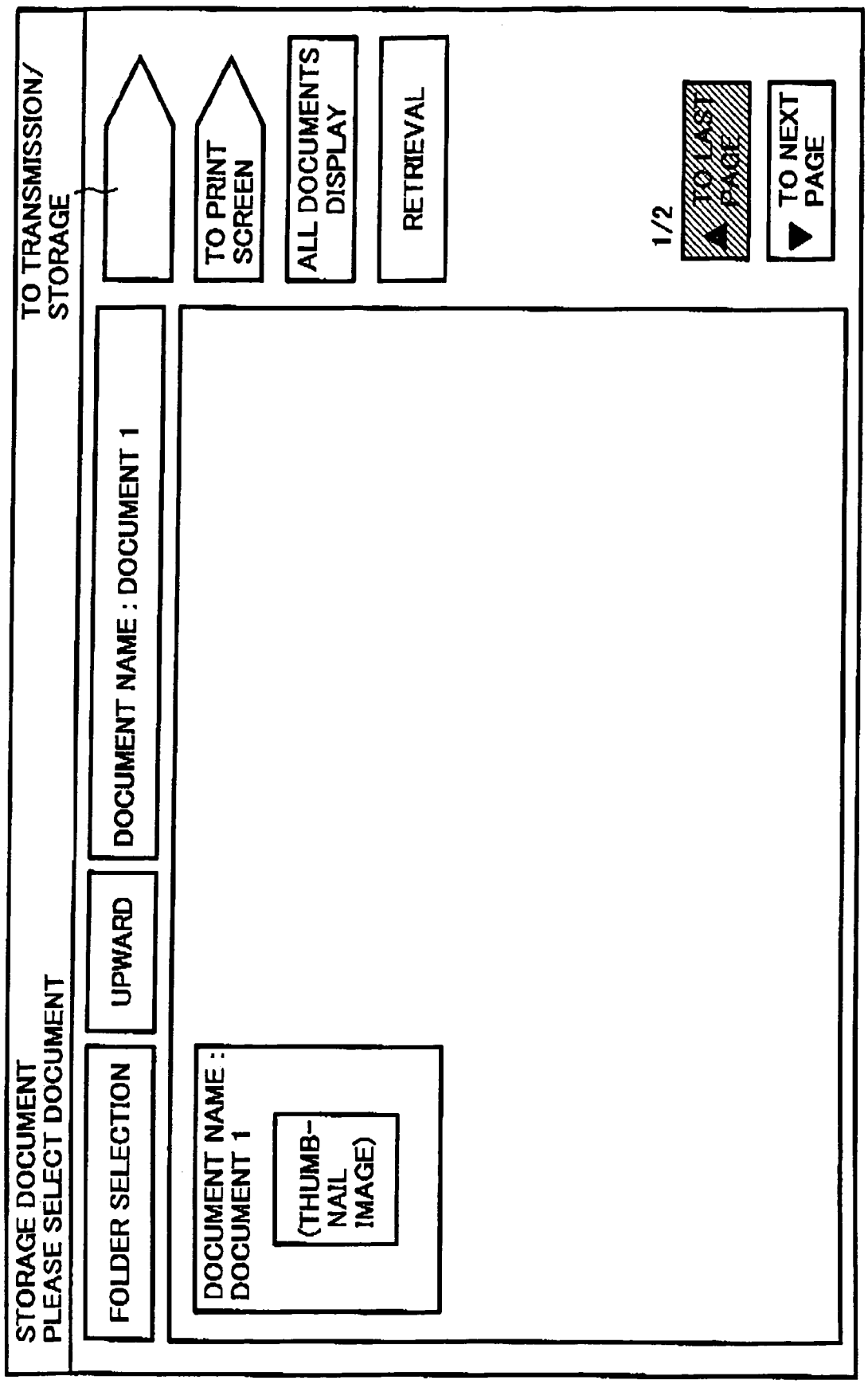

In the display screen shown in the drawings subsequent to FIG. 26A, elements having oblique lines represent unavailability of selection, while elements written by thick lines represent availability of selection.

When a thumbnail displayed on a first page is depressed to designate a transmission document, a screen transits and displays only a thumbnail image of a selected transmission document as shown in FIG. 26A. When such selection is completed, a button indicating "to transmission/storage" on the right upper side on the screen is depressed. Then, a selection screen of a mail destination is displayed as shown in FIG. 26B. Items displayed on the selection screen of the mail destination substantially correspond to those registered in the mail destination section on the personal setting information screen on the personal setting information screen.

A "planning department" is selected as a "To" field, for example. When selection of such a destination is completed, and a user depresses an "OK" button, a screen for selecting a mail-returning destination is displayed as shown in FIG. 27A. A "service department" is selected as a mail-returning destination, for example. Items displayed on such a selection screen substantially correspond to those registered in the mail destination screen as personal setting information.

When selection of the mail returning destination is completed and a user depresses an "OK" button, a screen for selecting a "case name" is displayed as shown in FIG. 27B. Items displayed on such a selection screen substantially correspond to those registered in the case name/body context screen as personal setting information.

Beside listed items, a "direct inputting" can be utilized. Specifically, when the "direct inputting" is designated, an input screen indicating a keyboard is separately open, and an optional character string can be input.

Figure 28:
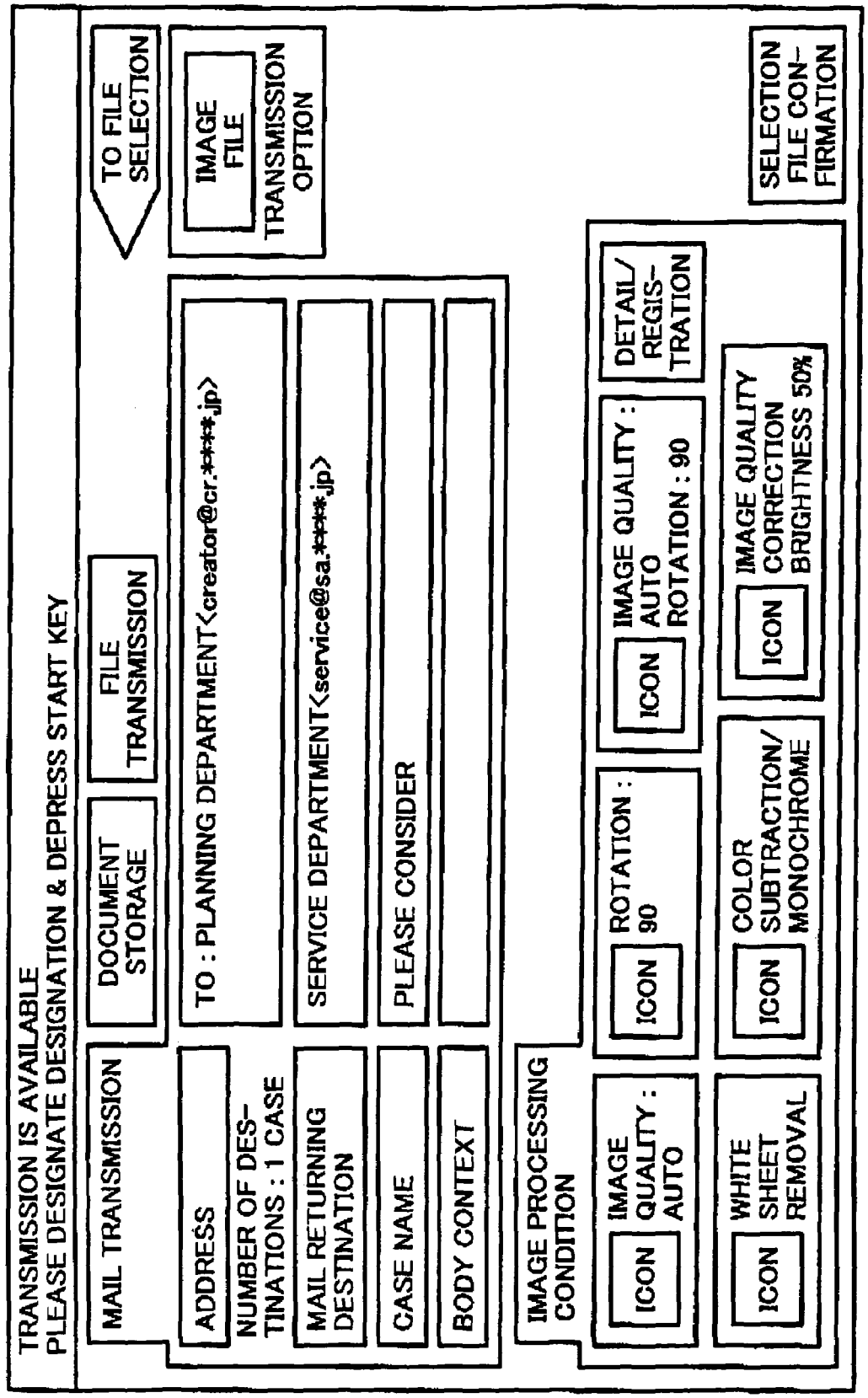
FIG. 28 illustrates an exemplary operational screen after a destination, a return mail destination, and a case name are designated.

Upon completion of inputting and depression of an "OK" button, a screen enabling selection of a transmission option is displayed as shown in FIG. 28. A user then depresses a button of "transmission option" displayed on the right side of the screen to set a "document storage link".

Thus, a sub window pops up and is displayed on the display screen of FIG. 28 as shown in FIG. 29A as an initial status. After that, a "do" button is depressed for transmitting the document storage link. Thus, items of link types located below can be operated as shown in FIG. 29B.

A user then depresses a "document storage link" as a link type, as well as an "OK" button.

Then, the display screen of the transmission option is changed to display to a transmission condition of an electronic mail to be sent as shown in FIG. 30. When an "OK" button is depressed on the screen, the sub window disappears, and the screen of FIG. 28 appears again.

When document storage is executed just before, and thus a selected document has not been completely stored at that time, a screen prompting completion of transmission document storage is displayed.

When a user turns on a start key of a keyboard 41b, a multifunctional product 1 creates information as header information, to which a designated destination, a case name, and a mail retuning destination are assigned, and adds URL information to obtain a designated storage document as body context information of an electronic mail.

Then, the electronic mail is transmitted.

Figure 31:
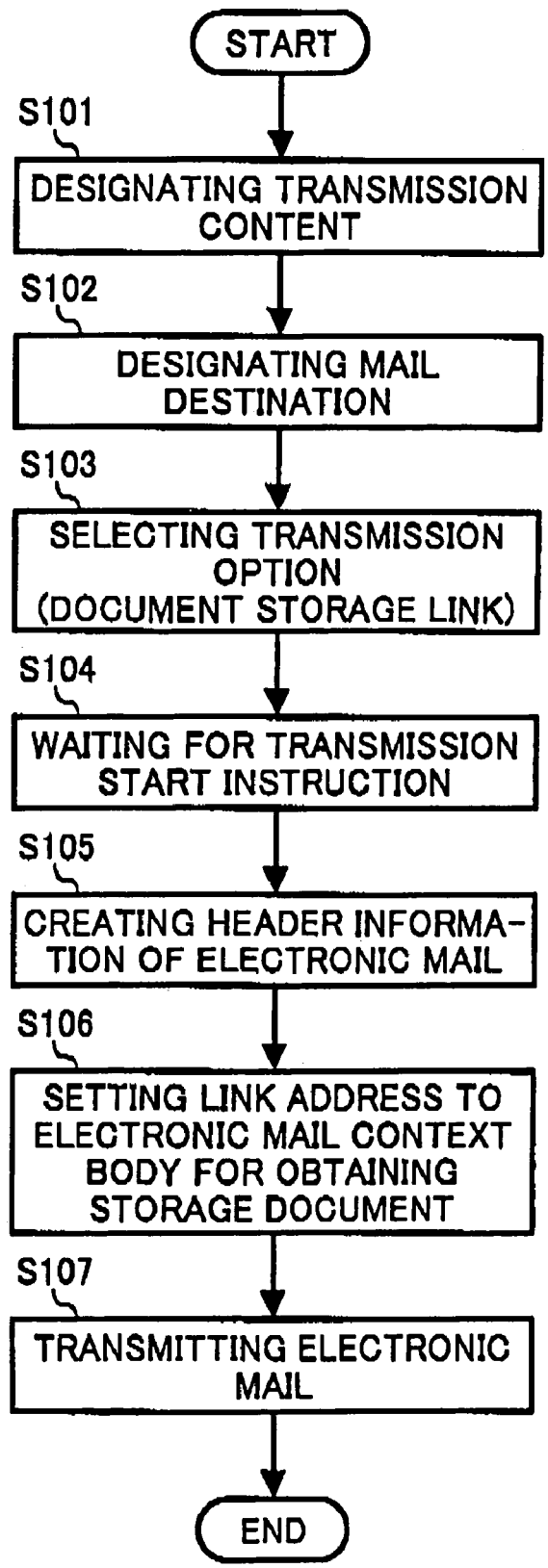
FIG. 31 illustrates an exemplary processing executed when a file transmission link is transmitted.

An exemplary sequence executed when a document storage link is transmitted from the multifunctional product 1 is now described with reference to FIG. 31.

Initially, a user designates a transmission content (e.g. a document file) in step S101. The user then designates a mail destination in step S102. The user then selects a transmission option and designates a storage document link transmission in step S103. The user then waits for an instruction to start transmission.

When the transmission is started, header information is formed from a designated destination, a case name, and a mail-retuning destination. Simultaneously, URL (e.g. a link address) is formed and set as body context information of an electronic mail to obtain a designated storage document file from a HDD of its own.

Then, an electronic mail formed in steps S105 and S106 is transmitted in step S107, and an operation is terminated.

Figure 32A:
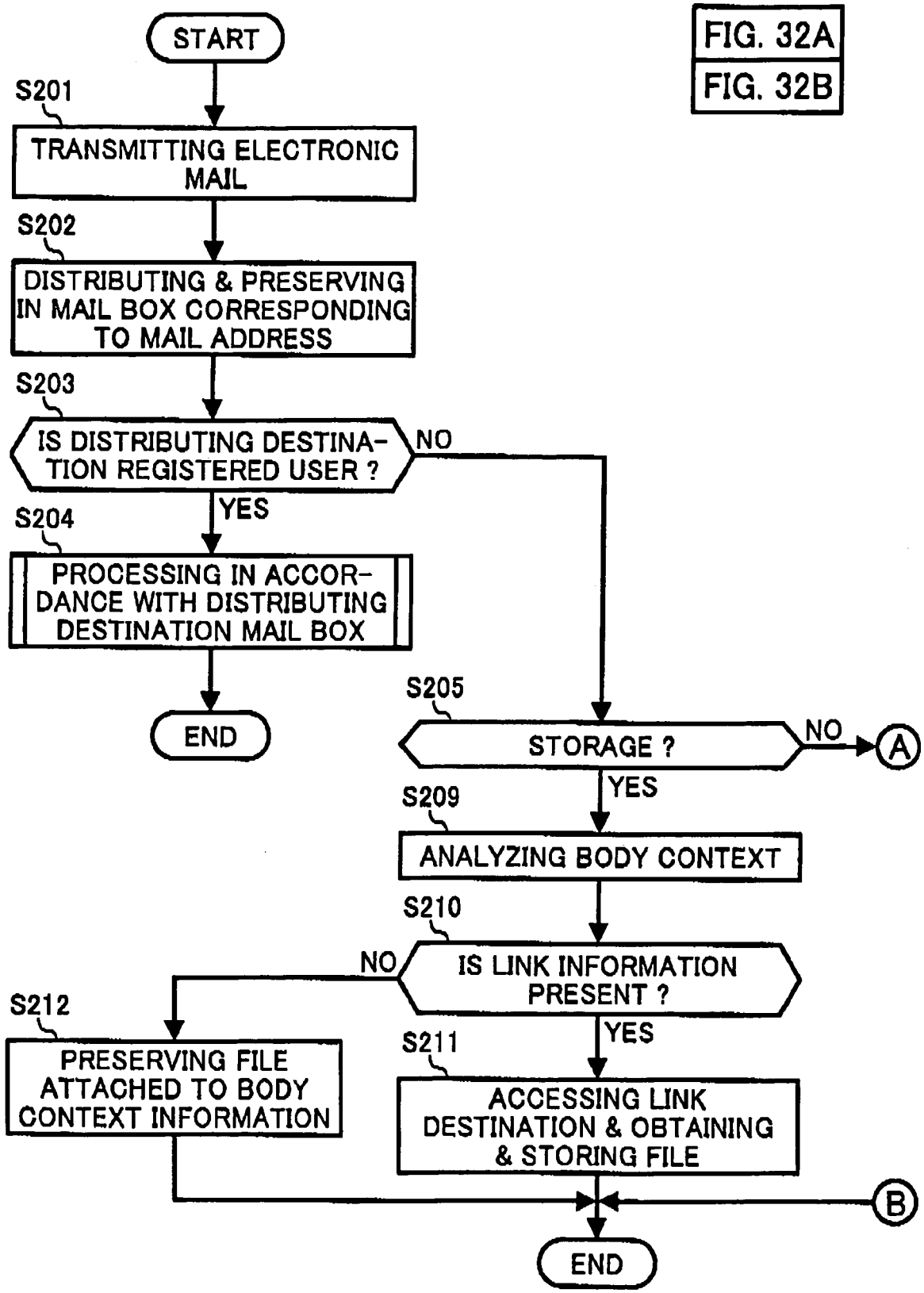
FIGS. 32A and 32B collectively illustrate an exemplary processing executed when an electronic mail is received.
Figure 32B:
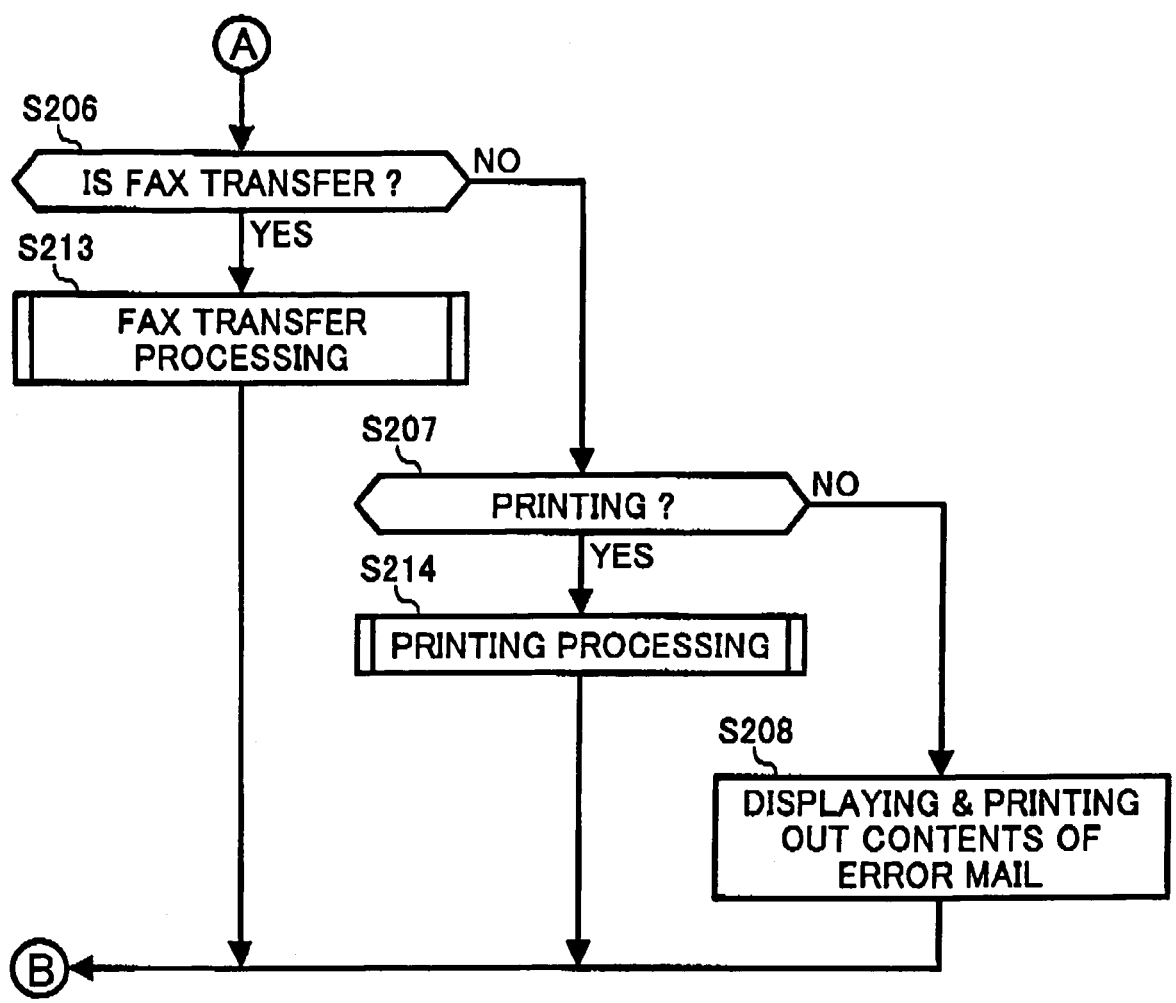

An exemplary sequence executed by a multifunctional product 100 when an electronic mail is received is now described with reference to FIGS. 32A and 32B.

Initially, when an electronic mail is received in step S201, the electronic mail is distributed and preserved in a mailbox in correspondence with a destination mail address included therein in step S202.

Then, it is checked if a distributed destination is a mailbox of a registered user with reference to the mail address, in step S203. If the result is positive (Yes in step S203), processing set corresponding to the mailbox of the distributed destination is executed in step S204.

When the result in step S203 is negative (i.e., No), since the electronic mail is directed to a guest user not registered beforehand, and accordingly to the multifunctional product 100 itself, it is further checked if a distribution destination is either a "storage mail box", a "facsimile transfer mail box", a "printing mail box", or an "error mail box" in steps S205, S206, and S207, respectively by checking the mail address.

When the determination is negative in step S207, and accordingly, the distribution destination is the "error mail box", contents of a reception error mail are displayed or printed out depending upon settings in step S208.

When the result of the determination is negative (i.e., No) in step S205, and accordingly, the distribution destination is the "storage mail box", it is further checked if link information is included in body context information in step S210.

When the determination in step S210 is positive, link information is processed by an applicable application, and a designated file is finally obtained in step S211 as mentioned earlier. If the determination is negative (i.e., No) in step S210, a file attached to the body context information is preserved in the own terminal in step S212.

When the determination is positive (i.e., Yes) in step S206, and accordingly, the distribution destination is the "facsimile transfer mail box", prescribed facsimile transfer processing is executed in accordance with contents of a reception electronic mail in step S213.

When the determination is negative (i.e., No) in step S206, and accordingly, the distribution destination is the "printing mail box", a file attached to a reception electronic mail is printed out in step S214.

Numerous additional modifications and variations of the present invention are possible in light of the above teachings. It is therefore to be understood that within the scope of the appended claims, the present invention may be practiced otherwise that as specifically described herein.

The invention claimed is:

1. A multifunctional product configured to communicate data with at least one other multifunctional product over a network using a prescribed communications protocol, said multifunctional product comprising:
   an image information obtaining device configured to obtain image information;
   a document file storing device configured to store the image information in a prescribed location as a document file;
   a designating device configured to designate at least one other multifunctional product to receive a document file; and
   an electronic mail transmission device configured to transmit an electronic mail to the multifunctional product designated by the designating device with confidential link information including partial location information related to a location of the document file;
   wherein said at least one other multifunctional product includes a table listing at least one full location information enabling the at least one other multifunctional product to access a corresponding document file, and identifies corresponding full location information based on the partial location information; and
   wherein said at least one other multifunctional product downloads the document file by accessing the document file storing device using the corresponding full location information.

2. The multifunctional product as claimed in claim 1, wherein the document file is provided with an attribution indicating if image information of the document file is disclosed, and wherein the network multifunctional product requests authorization information when the document file having the attribution representing that image information is not disclosed is accessed.

3. The multifunctional product as claimed in claim 2, wherein said attribution is attached to the document file when the document filed is made.

4. The multifunctional product as claimed in claim 2, wherein said at least one other multifunctional product executes communications in accordance with the confidential link information when accessing the document file storing device.

5. A multifunctional product configured to communicate data with at least one other multifunctional product over a network using a prescribed communications protocol, said multifunctional product comprising:
   means for obtaining image information;
   means for storing the image information in a prescribed location as a document file;
   means for designating at least one other multifunctional product to receive a document file; and
   means for transmitting an electronic mail to the multifunctional product designated by the means for designating with confidential link information including partial location information related to a location of the document file;
   wherein said at least one other multifunctional product includes a table listing at least one full location information enabling the at least one other multifunctional product to access a corresponding document file, and identifies corresponding full location information based on the partial location information; and
   wherein said at least one other multifunctional product downloads the document file by accessing the means for storing using the corresponding full location information.

6. The multifunctional product as claimed in claim 5, wherein the document file is provided with an attribution indicating if image information of the document file is disclosed, and wherein the network multifunctional product requests authorization information when the document file having the attribution representing that image information is not disclosed is accessed.

7. The multifunctional product as claimed in claim 6, wherein said attribution is attached to the document file when the document filed is made.

8. The multifunctional product as claimed in claim 6, wherein said at least one other multifunctional product executes communications in accordance with the confidential link information when accessing the means for storing.

* * * * *